(12) United States Patent
Notaguchi et al.

(10) Patent No.: US 10,617,065 B2
(45) Date of Patent: Apr. 14, 2020

(54) SEEDLING NURSERY MEMBER AND SEEDLING NURSERY SET FOR GRAFTING, AND METHOD FOR PRODUCING GRAFTED SEEDLING

(71) Applicant: National University Corporation Nagoya University, Aichi (JP)

(72) Inventors: Michitaka Notaguchi, Aichi (JP); Naoki Yanagisawa, Aichi (JP); Hideyuki Arata, Aichi (JP); Shuka Ikematsu, Aichi (JP)

(73) Assignee: NATIONAL UNIVERSITY CORPORATION NAGOYA UNIVERSITY, Aichi (JP)

( * ) Notice: Subject to any disclaimer, the term of this patent is extended or adjusted under 35 U.S.C. 154(b) by 0 days.

(21) Appl. No.: 15/550,942

(22) PCT Filed: Feb. 12, 2016

(86) PCT No.: PCT/JP2016/054168
§ 371 (c)(1),
(2) Date: Aug. 14, 2017

(87) PCT Pub. No.: WO2016/129683
PCT Pub. Date: Aug. 18, 2016

(65) Prior Publication Data
US 2018/0027744 A1    Feb. 1, 2018

(30) Foreign Application Priority Data
Feb. 13, 2015   (JP) ................................ 2015-026570

(51) Int. Cl.
*A01G 9/029*   (2018.01)
*A01G 2/30*   (2018.01)
(Continued)

(52) U.S. Cl.
CPC ............. *A01G 9/0295* (2018.02); *A01G 2/30* (2018.02); *A01G 24/44* (2018.02); *A01G 2009/003* (2013.01)

(58) Field of Classification Search
CPC ...... A01G 9/0295; A01G 9/0293; A01G 2/30; A01G 2/32; A01G 2/35; A01G 2/38;
(Continued)

(56) References Cited

U.S. PATENT DOCUMENTS 1,446,113 A * 2/1923 Blackwell .............. A01G 9/021
47/74
3,028,705 A * 4/1962 Howard ............... A01G 9/0295
47/87
(Continued)

FOREIGN PATENT DOCUMENTS

DE    8912710 U1   4/1991
EP    0829199 A2   3/1998
(Continued)

OTHER PUBLICATIONS

English translation of the International Preliminary Report on Patentability dated Aug. 17, 2017 for corresponding International Application No. PCT/JP2016/054168, filed Feb. 12, 2016.
(Continued)

*Primary Examiner* — Joshua D Huson
(74) *Attorney, Agent, or Firm* — David D. Brush; Westman, Champlin & Koehler, P.A.

(57) ABSTRACT

A seedling nursery member for grafting according to an aspect of the present disclosure includes at least one seedling nursery unit. At least one seedling nursery unit includes a seed storage section configured to store a seed of a plant and have a space for the plant to germinate, a stem storage section configured to store a stem of the plant that has germinated and elongated, and a stem holder configured to
(Continued)

hold the elongated stem of the plant. At least a portion of the seed storage section of at least one seedling nursery unit is configured to be openable to the outside of at least one seedling nursery unit. At least a portion of the stem storage section of at least one seedling nursery unit is configured to be openable to the outside of at least one seedling nursery unit.

29 Claims, 23 Drawing Sheets

(51) Int. Cl.
*A01G 9/00* (2018.01)
*A01G 24/44* (2018.01)

(58) Field of Classification Search
CPC ........ A01G 2/20; A01G 9/0299; A01G 9/029;
A01G 9/021; A01G 9/0291; A01G
2009/003; A01G 24/44; A01G 24/60;
A01G 24/00; A01G 24/28; A01G 24/48
USPC .............................................................. 47/6
See application file for complete search history.

(56) References Cited

U.S. PATENT DOCUMENTS

| | | | | |
|---|---|---|---|---|
| 3,447,261 A * | 6/1969 | Hundt | .................. | A01G 9/0295 47/77 |
| 3,835,584 A * | 9/1974 | Shimazu | ................ | A01G 24/00 47/64 |
| 3,962,822 A * | 6/1976 | Walters | ................ | A01G 9/0295 47/74 |
| 3,973,355 A * | 8/1976 | McKenzie | ............. | A01G 24/28 47/59 R |
| 3,992,810 A * | 11/1976 | Kimball | ............... | A01G 9/0295 47/77 |
| 4,012,866 A * | 3/1977 | Brokaw | .................... | A01G 2/30 47/6 |
| 4,050,188 A * | 9/1977 | van Wingerden | ... | A01G 9/0295 47/85 |
| 4,057,932 A * | 11/1977 | Spencer | ................ | A01G 9/0295 47/77 |
| 4,813,178 A * | 3/1989 | Ferrand | .............. | A01G 13/0237 47/77 |
| 5,131,185 A * | 7/1992 | Wingerden | ............ | A01G 9/086 47/73 |
| 5,209,011 A * | 5/1993 | Mori | ........................ | A01G 2/30 47/6 |
| 5,218,783 A * | 6/1993 | Langezaal | .............. | A01G 24/00 47/64 |
| 5,339,566 A * | 8/1994 | Cormier | ............... | A01G 9/0295 47/87 |
| 6,050,027 A * | 4/2000 | Pavelka | ................. | B65D 75/22 47/84 |
| 6,176,037 B1 * | 1/2001 | Muramatsu | .......... | A01G 9/0293 47/64 |
| 7,171,782 B2 * | 2/2007 | Felknor | ................ | A01G 9/0291 47/73 |
| 7,614,182 B2 * | 11/2009 | Oderwald | ................ | A01G 7/00 47/58.1 R |
| 9,462,756 B2 * | 10/2016 | Lin | ...................... | A01G 9/0295 |
| 9,795,090 B2 * | 10/2017 | Nilsson | ................. | A01G 27/04 |
| 2003/0014915 A1 * | 1/2003 | Holmberg | ............ | A01G 9/0295 47/77 |
| 2004/0118041 A1 * | 6/2004 | Rombouts | ................ | A01G 2/30 47/58.1 CF |
| 2007/0000170 A1 * | 1/2007 | Hempenius | ............ | A01G 31/02 47/64 |
| 2008/0078118 A1 * | 4/2008 | Bissonnette | ............. | A01G 9/02 47/63 |
| 2012/0137581 A1 * | 6/2012 | Teasdale | ................ | A01G 31/02 47/66.6 |
| 2013/0160361 A1 * | 6/2013 | Keithly | .................... | A01G 9/02 47/66.7 |
| 2013/0180171 A1 | 7/2013 | Oldenburg | | |
| 2015/0135592 A1 * | 5/2015 | Lin | ...................... | A01G 9/0295 47/86 |
| 2015/0373924 A1 | 12/2015 | Janssen et al. | | |
| 2016/0073597 A1 * | 3/2016 | Kouno | ................... | A01G 9/083 47/62 R |
| 2016/0270310 A1 * | 9/2016 | Botman | ................. | A01G 22/00 |

FOREIGN PATENT DOCUMENTS

| | | | | |
|---|---|---|---|---|
| JP | 1990127149 U | 10/1990 | | |
| JP | 1991099930 U | 10/1991 | | |
| JP | H07327498 A | 12/1995 | | |
| JP | 08242699 A | 9/1996 | | |
| JP | H08280265 A | 10/1996 | | |
| JP | 2006238805 A | 9/2006 | | |
| WO | WO-9213441 A1 * | 8/1992 | ............. | A01G 24/00 |
| WO | WO-2011107943 A1 * | 9/2011 | ............... | A01G 2/30 |
| WO | 2014135681 A1 | 9/2014 | | |

OTHER PUBLICATIONS

International Search Report dated Mar. 29, 2016 for corresponding International Application No. PCT/JP2016/054168, filed Feb. 12, 2016.
Partial English translation of the Written Opinion of the International Searching Authority dated Apr. 12, 2016 for corresponding International Application No. PCT/JP2016/054168, filed Feb. 12, 2016.
Extended European Search Report dated-Aug. 14, 2018, for corresponding European Application No. 16749326.1.
English translation of the Office Action dated Apr. 12, 2019 for corresponding Eurasian Patent Application No. 201791827.
Office Action dated Jun. 4, 2019 in the corresponding European Patent Application No. 16749326.1.
Partial English translation of Notification of Defects in Israeli Patent Application, dated Jun. 24, 2019 for corresponding Israeli Patent Application No. 253842.
English translation of the First Office Action dated Jul. 9, 2019 for Corresponding Chinese Patent Application No. 201680010049.2.
Examination Report No. 1 for Standard Patent Application, dated Aug. 8, 2019 for corresponding Australian Patent Application No. 2016216962.
Office Action dated Sep. 17, 2019 for the corresponding Brazil Patent Application No. 112017017228.
English translation of the Office Action dated Jan. 14, 2020 in the corresponding Egyptian patent application No. 1361/2017PCT.
English translation the Indonesian Office Action dated Jan. 22, 2020 for corresponding Application No. PID201705956.

* cited by examiner

FIG. 20A
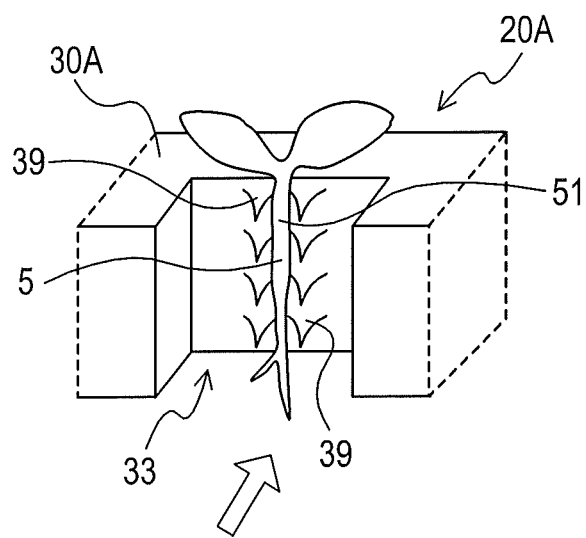
FIG. 20B
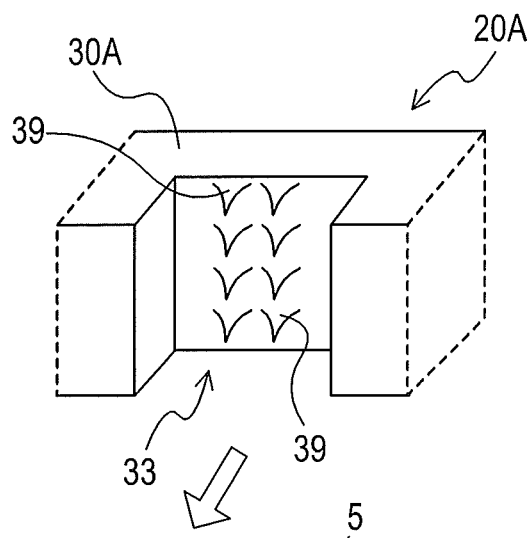
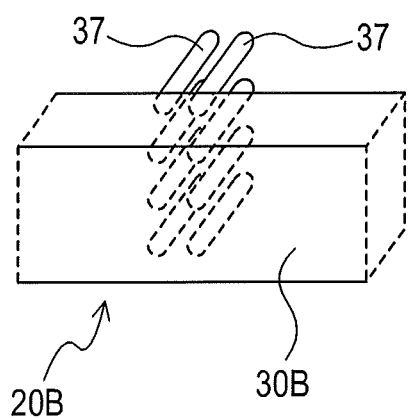
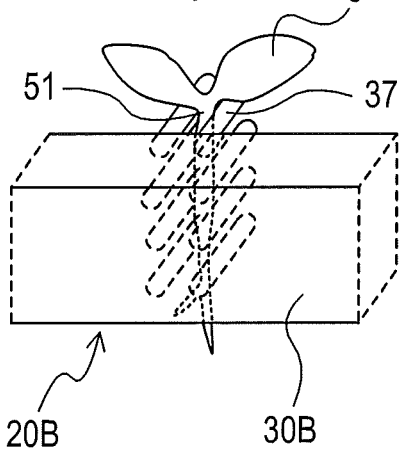

FIG. 21A
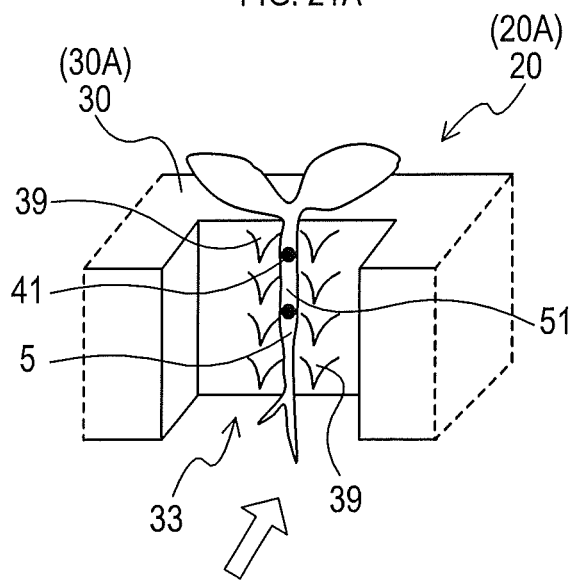
FIG. 21B
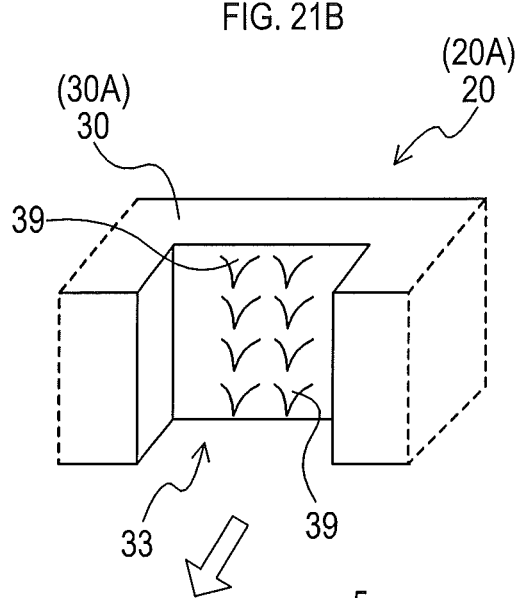
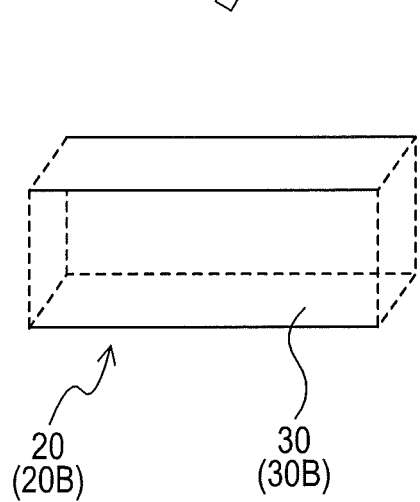
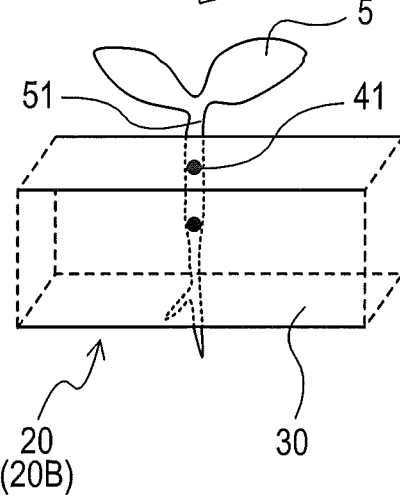

SEEDLING NURSERY MEMBER AND SEEDLING NURSERY SET FOR GRAFTING, AND METHOD FOR PRODUCING GRAFTED SEEDLING

CROSS-REFERENCE TO RELATED APPLICATIONS

This Application is a Section 371 National Stage Application of International Application No. PCT/JP2016/054168, filed Feb. 12, 2016, published as WO 2016/129683 A1 on Aug. 18, 2016, not in English, and claims priority to Japanese Patent Application No. 2015-026570 filed on Feb. 13, 2015 in the Japanese Patent Office, the contents of which are incorporated herein by reference in their entireties.

TECHNICAL FIELD

The present disclosure relates to a seedling nursery member and a seedling nursery set for grafting, and a method for producing a grafted seedling.

BACKGROUND ART

Grafting is widely used in the field of agriculture and horticulture for the purpose of avoiding continuous cropping, improving the quality and the number of in gathered crops, and increasing of new varieties, or the like, which is a very popular technique. Although grafting is widely spread regardless of whether for business use or home use, most of grafting is carried out by human hands. Since the grafting operation requires a certain level of practice, there are such problems that qualities of grafted seedlings are varied, and the production rate is slow. As a method for solving these problems, Patent Literature 1 discloses a fully automatic grafting device. In addition, Patent Literatures 2 to 7 disclose various grafting members. Also, since grafting is premised on operation with human hands, it is applied to only plant bodies grown to a size that can be handled with hands.

PRIOR ART DOCUMENTS

Patent Documents

Patent Document 1: Japanese Unexamined Patent Publication No. 2006-238805
Patent Document 2: Japanese Unexamined Utility Model Publication No. H2-127149
Patent Document 3: Japanese Unexamined Utility Model Publication No. H3-99930
Patent Document 4: Japanese Unexamined Patent Publication No. H7-327498
Patent Document 5: Japanese Unexamined Patent Publication No. H8-242699
Patent Document 6: Japanese Unexamined Patent Publication No. H8-280265
Patent Document 7: European Patent Application Publication No. 82919

SUMMARY OF THE INVENTION

Problems to be Solved by the Invention

As described above, since the grafting operation requires a certain level of practice, there are such problems that qualities of grafted seedlings are varied, and the production rate is slow. Since the fully automatic grafting device disclosed in Patent Literature 1 is large and expensive, it is unsuitable for production of grafted seedlings by small businesses. The grafting members disclosed in Patent Literatures 2 to 7 includes, for example, a grafting member having a seed storage section for storing plant seeds and a stem storage section communicating with the seed storage section. When the plant seeds are introduced from the stem storage section into the seed storage section, it is necessary to make the inner diameter of the stem storage section larger than the inner diameter of the seed storage section. Thus, a stem of the plant stored in the stem storage section cannot be sufficiently held, and positioning of the stem of the plant becomes difficult in grafting. As a result, the success rate of grafting decreases, and the workability of grafting becomes poor. Also, since the grafting accuracy is low, it is difficult to graft small plants. Moreover, plants that can be handled with hands or large equipment are limited to plants with large sizes. Thus, grafting has been applied only to plants with large seedlings such as Cucurbitaceae and Solanaceae among vegetables.

An aspect of the present disclosure is to make it possible to easily produce grafted seedlings regardless of the size and growth stage of a plant body to be grafted and to improve the productivity and quality of grafted seedlings and reduce the cost.

Means for Solving the Problems

A seedling nursery member for grafting according to an aspect of the present disclosure includes at least one seedling nursery unit. At least one seedling nursery unit includes a seed storage section configured to store a seed of a plant and have a space for the plant to germinate, a stem storage section configured to store a stem of the plant that has germinated and elongated, and a stem holder configured to hold the elongated stem of the plant. At least a portion of the seed storage section of at least one seedling nursery unit is configured to be openable to the outside of the seed storage section. At least a portion of the stem storage section of at least one seedling nursery unit is configured to be openable to the outside of the stem storage section.

The seedling nursery member for grafting includes at least one seedling nursery unit. At least one seedling nursery unit has a simple structure including the seed storage section, the stem storage section, and the stem holder. Thus, it is possible to easily prepare a plant body (seedling for grafting) to be grafted using the seedling nursery member. In particular, since at least one seedling nursery unit includes the stem holder, it is possible to easily prepare seedlings for grafting in a state where stems are held by the stem holder.

For example, a first plant is grown by a first seedling nursery member, and a second plant is grown by a second seedling nursery member. Then, the stem of the first plant held by the stem holder of the seedling nursery unit in the first seedling nursery member is cut, and the stem of the second plant held by the stem holder of the seedling nursery unit in the second seedling nursery member is cut. Then, the cut surface of the stem of the first plant in the first seedling nursery member and the cut surface of the stem of the second plant in the second seedling nursery member are joined. In this way, it is possible to perform grafting accurately with simple and mechanical work. Accordingly, anyone can easily produce uniform grafted seedlings with high accuracy, and the productivity and quality of the grafted seedlings can be improved.

The seedling nursery member (at least one seedling nursery unit) can be prepared with a simple structure. Thus, many seedling nursery members can be prepared. Consequently, a large amount of grafted seedlings can be produced using the seedling nursery members. Since the size of the seedling nursery member can be easily adjusted according to a plant body to be grafted, grafting can be easily carried out regardless of the size of a plant ranging from smallest to largest and regardless of the growth stage ranging from a young seedling immediately after germination to a growing plant body.

By using the seedling nursery member, preparation for seedling raising becomes easy, and, at the same time, it is possible to save a space for a seedling raising site. Further, a plant growing period can be shortened. Consequently, growing cost can be reduced. If young plants (especially young plants of small sizes that cannot be handled with bare hands) are targeted, it is possible to reduce the growing cost due to shortening of the growing periods and reduce the transportation cost due to small-sized grafted seedlings.

At least a portion of the seed storage section of at least one seedling nursery unit is configured to be openable to the outside of the seed storage section. Thus, seeds of a plant can be easily introduced into the seed storage section through an opening portion of the seed storage section. Consequently, it is not necessary to introduce the seeds of the plant from the stem storage section, so that the inner diameter of the stem storage section can be set according to the diameter of the stem of the plant. Further, for example, a plant growth medium or the like necessary for germination and growth of plants can be supplied to the seed storage section (specifically, seeds of a plant stored in the seed storage section) through the opening portion of the seed storage section, so that the plants can be easily and smoothly grown.

At least a portion of the stem storage section of at least one seedling nursery unit is configured to be openable to the outside of the stem storage section. Thus, for example, a plant growth medium or the like necessary for germination and growth of plants can be supplied to the stem storage section (specifically, stems of a plant stored in the stem storage section) through the opening portion of the stem storage section, so that the plants can be easily and smoothly grown. Further, it is possible to extend a stem of a plant and to develop cotyledons, primary leaves and the like outside at least one seedling nursery unit, so that the plant can be easily and smoothly grown.

Further, for example, by using a plant growth medium such as an agar medium, it is possible to greatly reduce the size of the seedling nursery member and to easily prepare a seedling nursery member of a desired shape as compared with a case using soil of large granules or the like. Furthermore, by using a small seedling nursery member, it is possible to position (determine coordinates of) seedlings for grafting (for example, cut surfaces of plant stems) on a micrometer order, so that grafting can be carried out with high accuracy. Thus, it is possible to easily and accurately carry out grafting of young plants, which has been conventionally difficult.

For example, a stem of a plant that has germinated and elongated can be immediately held by the stem holder of at least one seedling nursery unit, so that grafting can be carried out immediately after cotyledons, primary leaves, and the like appear outside at least one seedling nursery unit through the opening portion of the stem storage section. Consequently, young plants after germination can be immediately grafted.

A seedling nursery set for grafting according to another aspect of the present disclosure includes a plurality of the seedling nursery members for grafting.

The seedling nursery set for grafting includes a plurality of the seedling nursery members for grafting described above. Thus, grafting can be easily carried out as described above. Further, anyone can easily produce uniform grafted seedlings, and the quality of the grafted seedlings can be improved. Furthermore, the growing cost and transportation cost can be reduced.

A method for producing a grafted seedling according to still another aspect of the present disclosure, includes: preparing a first seedling nursery member and a second seedling nursery member, each of which is the seedling nursery member for grafting; storing seeds of a first plant in the seed storage section of the seedling nursery unit in the first seedling nursery member, germinating the seeds of the first plant in the seed storage section of the seedling nursery unit, and elongating a stem of the first plant in the stem storage section of the seedling nursery unit; holding the stem of the first plant by the stem holder of the seedling nursery unit in the first seedling nursery member; cutting the stem of the first plant held by the stem holder of the seedling nursery unit in the first seedling nursery member; storing seeds of a second plant in a seed storage section of a seedling nursery unit in a second seedling nursery member, germinating the seeds of the second plant in the seed storage section of the seedling nursery unit, and elongating a stem of the second plant in the stem storage section of the seedling nursery unit; holding the stem of the second plant by the stem holder of the seedling nursery unit in the second seedling nursery member; cutting the stem of the second plant held by the stem holder of the seedling nursery unit in the second seedling nursery member; and joining a cut surface of the stem of the first plant held by the stem holder of the seedling nursery unit in the first seedling nursery member and a cut surface of the stem of the second plant held by the stem holder of the seedling nursery unit in the second seedling nursery member.

The method for producing a grafted seedling is carried out using a plurality of seedling nursery members for grafting described above. Thus, as described above, grafting can be easily carried out with high accuracy, and a grafted seedling can be easily produced with high accuracy. Further, anyone can easily produce uniform grafted seedlings with high accuracy, and the quality of the grafted seedlings can be improved. Furthermore, the growing cost and transportation cost can be reduced.

Thus, according to one aspect of the present disclosure, it is possible to inexpensively and easily produce grafted seedlings regardless of the size and growth stage of a plant body to be grafted and to improve the productivity and quality of grafted seedlings and reduce the cost.

In the seedling nursery member for grafting, at least a portion of the seed storage section of at least one seedling nursery unit is configured to be openable to the outside of at least one seedling nursery unit. The configuration in which the seed storage section is openable to the outside of at least one seedling nursery unit includes: a configuration in which the seed storage section has an opening portion communicating with the outside of at least one seedling nursery unit; and a configuration in which the seed storage section has an opening portion communicating with the outside of at least one seedling nursery unit, and a member capable of opening and closing the opening portion is provided. It is preferable that the plant growth medium is supplied via a thin sheet member having water permeability, such as a membrane or a filter paper. If a firmly formed agar medium is used as the plant growth medium, it becomes unnecessary to use the above-described sheet member.

At least a portion of the stem storage section of at least one seedling nursery unit is configured to be openable to the outside of at least one seedling nursery unit. The configuration in which at least a portion of the stem storage section is openable to the outside of at least one seedling nursery unit includes the same configuration as the seed storage section described above.

At least one seedling nursery unit may further include a root storage section configured to store a root of a plant that has germinated and elongated. In this case, the root of the plant can be elongated in the root storage section. Consequently, the plant can be easily and smoothly grown.

At least a portion of the root storage section of at least one seedling nursery unit may be configured to be openable to the outside of at least one seedling nursery unit. In this case, for example, a plant growth medium or the like necessary for germination and growth of a plant can be supplied to the root storage section (specifically, a root of a plant stored in the root storage section) through an opening portion of the root storage section, so that the plant can be easily and smoothly grown. Further, it is possible to further extend a root of a plant outside at least one seedling nursery unit, so that the plant can be easily and smoothly grown. The configuration in which at least a portion of the root storage section is openable to the outside of at least one seedling nursery unit includes the same configuration as the seed storage section described above.

The stem holder of at least one seedling nursery unit may be configured to be movable so as to hold a stem of a plant in a state of being in contact with the elongated stem of the plant. In this case, even if the diameter of the stem of the plant changes due to growth, the stem of the plant can be sufficiently held while maintaining the state where the stem holder is in contact with the stem of the plant.

In at least one seedling nursery unit, the seed storage section may have such a cross-sectional shape that seeds of a water-absorbing plant can rotate. When the seed storage section is formed to have a circular cross-section, the diameter may be between a diameter comparable to the long diameter of the seed of the water-absorbing plant and a diameter about 2 to 3 times as large as the long diameter.

In at least one seedling nursery unit, the stem storage section may have such a width that allows cotyledons of a plant to pass through the stem storage section. Further, the width of the stem storage section may be such a width that allows the stem of the plant to be held at a predetermined position. Further, the width of the stem storage section may be about 1/10 to 1/2 of the diameter of the seed storage section. Further, the length of the stem storage section may be a length suitable for elongation of the stem of the plant. Furthermore, the stem storage section may be formed separately from the seed storage section, or may be integrally formed with the seed storage section.

In at least one seedling nursery unit, the root storage section may be a path having such a width that allows the root of the plant to pass therethrough. The width of the root storage section may be about 1/10 to 1/2 of the diameter of the seed storage section. As described above, at least a portion of the root storage section may be configured to be openable to the outside, or if there is a space (for example, the seed storage section) capable of sufficiently storing the root of the plant, the root storage section may be closed without opening to the outside. The root storage section may be formed separately from the seed storage section, or may be integrally formed with the seed storage section. Further, the root storage section may be formed separately from the stem storage section, or may be integrally formed with the stem storage section.

In at least one seedling nursery unit, the shape of the stem holder is not limited as long as the stem holder can hold an elongated stem of a plant. Here, holding the elongated stem of the plant means that the stem of the plant can be held in a fixed position. The stem holder may be composed of a portion of the stem storage section or may be provided separately from the stem storage section. For example, when a portion (for example, the inner wall surface) of the stem storage section is allowed to function as a stem holder, a stem may be held by pressing with a portion of the stem storage section. At this time, the width of the stem storage section may be formed in advance according to the thickness of the stem at the stage of growth. Further, the stem holder may be provided in the stem storage section.

At least one seedling nursery unit may have a plate shape. In this case, it is possible to reduce the size of at least one seedling nursery unit and further reduce the entire size of the seedling nursery member. In addition, downsizing of the seedling nursery member can save a space for a seedling raising site.

When at least one seedling nursery unit has a plate shape, for example, the seed storage section, the stem storage section, the root storage section and the like may be formed so as to open on one main face, or may be formed openably and closably. In this case, it becomes easy to introduce seeds into the seed storage section, supply a plant growth medium or the like to the seed storage section, the stem storage section, the root storage section and the like, and take out a grafted seedling after grafting.

At least one seedling nursery unit may include an elastically deformable material. In this case, it is possible to hold a plant having grown in at least one seedling nursery unit. For example, when a portion (for example, the inner wall surface) of the stem storage section is allowed to function as a stem holder, the stem of the grown plant can be held. Consequently, even when a stem of a plant in the stem storage section of at least one seedling nursery unit is cut and the seedling nursery member is divided into a plurality of portions, the stem of the plant can be held in the stem storage section. Since at least one seedling nursery unit can be deformed flexibly in accordance with the growth of the plant, it is possible to enhance the adhesion with the plant and easily hold the stem of the plant, and it is also possible to obtain an effect of suppressing inhibition of the growth of the plant. As the elastically deformable material, PDMS (polydimethylsiloxane) also called silicone rubber or the like can be used, for example. PDMS is a material which has high biocompatibility and can be easily cut with a blade or the like.

The seedling nursery member may be configured to be dividable into a plurality of portions so as to traverse the stem storage section of at least one seedling nursery unit. In this case, when cutting a stem of a plant in the stem storage section of at least one seedling nursery unit, if the seedling nursery member can be divided into a plurality of portions at the cutting position, the seedling nursery member does not need to be cut. Therefore, the seedling nursery member can be reused.

At least one seedling nursery unit may include a plurality of seedling nursery units. In this case, a larger amount of grafted seedlings can be produced using the seedling nursery member. Consequently, it is possible to further improve the productivity of grafted seedlings.

The plurality of seedling nursery units may be integrally provided. In this case, it is possible to simplify the structure of the seedling nursery member. In addition, operation for producing grafted seedlings with the use of a plurality of seedling nursery members is facilitated.

The plurality of seedling nursery units may be arranged side by side in a predetermined direction such that the respective stem storage sections of the plurality of seedling nursery units are oriented in the same direction. In this case, operation for producing grafted seedlings with the use of a plurality of seedling nursery members (in particular, cutting of stems of plants and joining of cut surfaces of the plant stems) is facilitated. The plurality of seedling nursery units may be arranged side by side in a two-dimensional (planar) manner, or may be arranged side by side in a three-dimensional (stereoscopic) manner.

In the plurality of seedling nursery units, the respective stem storage sections of the seedling nursery units may be arranged side by side at equal intervals. In this case, operation for producing grafted seedlings with the use of a plurality of seedling nursery members (in particular, cutting of stems of plants and joining of cut surfaces of the plant stems) is facilitated.

The seedling nursery member may be used for grafting of young plants. In this case, young plants (especially young plants of small sizes that cannot be handled with bare hands) are targeted, whereby it is possible to reduce the growing cost due to shortening of the growing periods and reduce the transportation cost due to small-sized grafted seedlings. Moreover, it is possible to effectively exercise the above-described effect that it is possible to graft even plants that are difficult to be grafted with human hands so far because they are too small. Here, the term "young plant" refers to a period between when the plant germinates and when the leaves first open. For example, in the case of plants of the Brassicaceae family, there includes a state of about 1 mm in length after several days (for example, 3 days) after germination.

A portion or the whole of the seedling nursery member may be formed of, for example, a biodegradable material. In this case, grafted seedlings produced using the seedling nursery member can be spread (sowed) on a large arable land together with the seedling nursery member without taking out the grafted seedlings from the seedling nursery member. As the biodegradable material, zein (water-insoluble protein extracted from corn) or the like can be used.

The seedling nursery member may be composed of a single member or a plurality of members. For example, the seedling nursery member may be provided by combining a member having a seed storage section and a stem storage section of at least one seedling nursery unit and a member having a stem holder of at least one seedling nursery unit.

In the seedling nursery set for grafting, when each of a plurality of seedling nursery members is provided with a plurality of seedling nursery units, in the plurality of seedling nursery units, the stem storage sections may be arranged side by side at equal intervals. In this case, operation for producing grafted seedlings with the use of a plurality of seedling nursery members (in particular, cutting of stems of plants and joining of cut surfaces of the plant stems) is facilitated. Also, when plants to be grafted have different sizes as well as when the plants have substantially the same sizes, positioning can be easily carried out, and grafting can be carried out with good workability.

The above-described method for producing a grafted seedling further includes dividing the first seedling nursery member into a plurality of portions to form a plurality of divided pieces, and dividing the second seedling nursery member into a plurality of portions to form a plurality of divided pieces. The joining of the cut surface of the stem of the first plant held by the stem holder of the seedling nursery unit in the first seedling nursery member and the cut surface of the stem of the second plant held by the stem holder of the seedling nursery unit in the second seedling nursery member may include arranging one of the plurality of divided pieces in the first seedling nursery member and one of the plurality of divided pieces in the second seedling nursery member such that the cut surface of the stem of the first plant held by the stem holder of the seedling nursery unit in the first seedling nursery member is in contact with the cut surface of the stem of the second plant held by the stem holder of the seedling nursery unit in the second seedling nursery member. In this case, the grafting operation (in particular, the joining of the cut surface of the stem of the first plant and the cut surface of the stem of the second plant) is facilitated.

In the above-described method for producing a grafted seedling, it is preferable that a plant growth medium for germination and growth of the first plant and the second plant is supplied to the seed storage section, the stem storage section, and the like of the seedling nursery unit in the first seedling nursery member and the second seedling nursery member. In this case, the first plant and the second plant can easily and smoothly germinate and grow.

In the method for producing a grafted seedling, when one end of the stem storage section of the seedling nursery unit in the first seedling nursery member and the second seedling nursery member is open to the outside of the seedling nursery unit, the first seedling nursery member and the second seedling nursery member are placed in a dark place until cotyledons, primary leaves, and the like of the first plant and the second plant reach one end of the stem storage section, and thereafter, the first seedling nursery member and the second seedling nursery member may be placed in a light place. In this case, by placing the first seedling nursery member and the second seedling nursery member in the dark place, a stem can be sufficiently elongated without developing cotyledons, primary leaves, and the like in the stem storage section of the seedling nursery unit, and the stem can be disposed properly. Further, by placing the first seedling nursery member and the second seedling nursery member in the light place, cotyledons, primary leaves, and the like can be developed outside the stem storage section of the seedling nursery unit. Furthermore, the stem grows thickly and is sufficiently held by the stem holder. Consequently, the first plant and the second plant can be easily and smoothly grown. Instead of placing the first seedling nursery member and the second seedling nursery member in a dark place and a light place, the first seedling nursery member and the second seedling nursery member may be formed of a material with low light permeability so that the inside of the seedling nursery unit is a dark place and the outside of the seedling nursery unit is a light place.

Further, the first plant and the second plant may be grown in a light place from start to finish as long as the stem of the first plant that has germinated and elongated can be sufficiently held by the stem holder of the seedling nursery unit in the first seedling nursery member, and as long as the stem of the second plant that has germinated and elongated can be sufficiently held by the stem holder of the seedling nursery unit in the second seedling nursery member.

In the above-described method for producing a grafted seedling, when cutting the stem of the first plant held by the stem holder of the seedling nursery unit of the first seedling nursery member, the first seedling nursery member may be cut together. Further, only the stem of the first plant may be cut, and the first seedling nursery member configured to be divided at the cutting position may be divided. When the first seedling nursery member is cut together, it is preferable that the first seedling nursery member is formed of a material easy to cut.

In the above-described method for producing a grafted seedling, when cutting the stem of the second plant held by the stem holder of the seedling nursery unit of the second seedling nursery member, the second seedling nursery member may be cut together. Further, only the stem of the second plant may be cut, and the second seedling nursery member configured to be divided at the cutting position may be divided. When the second seedling nursery member is cut together, it is preferable that the second seedling nursery member is formed of a material easy to cut.

In the above-described method for producing a grafted seedling, a plurality of plants including the first plant and the second plant are grafted to obtain a grafted seedling. Here, the plurality of plants may be the same kind of plants or plants belonging to different species, or they may be mixed.

In the above-described method for producing a grafted seedling, for example, a plant for a rootstock and a plant for a scion may be grafted. That is, two plants may be grafted together. Grafting may be carried out while placing a plant for an intermediate rootstock between the plant for the rootstock and the plant for the scion. One or a plurality of plants for an intermediate rootstock may be used. That is, three plants may be grafted, or four or more plants may be grafted together.

BRIEF DESCRIPTION OF THE DRAWINGS

FIGS. 20A and 20B are explanatory views showing a state of nursery seedling using the seedling nursery member.

FIGS. 21A and 21B are explanatory views showing a state of nursery seedling using the seedling nursery member.

EXPLANATION OF REFERENCE NUMERALS

Figure 1:
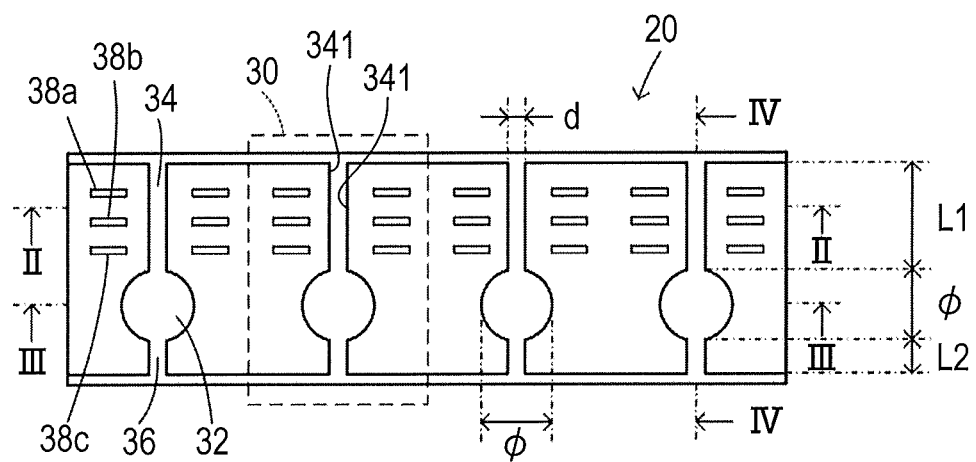
FIG. 1 is a plan view showing a configuration of a seedling nursery member.

20 . . . seedling nursery member, 30 . . . seedling nursery unit, 31 . . . stem holder, 32 . . . seed storage section, 34 . . . stem storage section

MODE FOR CARRYING OUT THE INVENTION

Hereinafter, embodiments of the present disclosure will be described with reference to the drawings.

First Embodiment

As shown in FIGS. 1 to 5, a seedling nursery member 20 for grafting of the first embodiment includes a plurality of seedling nursery units 30. Each of the seedling nursery units 30 includes a seed storage section 32 configured to store seeds of a plant and have a space for the plant to germinate, a stem storage section 34 configured to store a stem of the plant that has germinated and elongated, and a stem holder (an inner wall surface 341 of the stem storage section 34, which will be described later) configured to hold the elongated stem of the plant. A portion of the seed storage section 32 of each of the seedling nursery units 30 is configured to be openable to the outside of the seed storage section 32. A portion of the stem storage section 34 of each of the seedling nursery units 30 is configured to be openable to the outside of the stem storage section 34. Hereinafter, details of the seedling nursery member 20 for grafting will be described.

Figure 2:
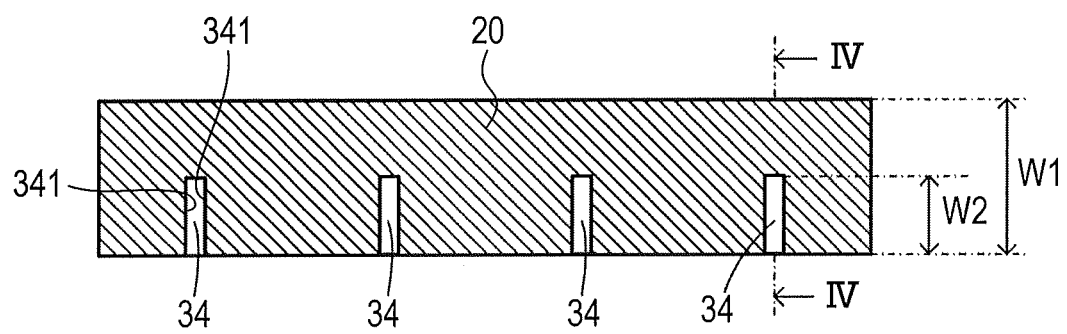
FIG. 2 is a cross-sectional view taken along line II-II of the seedling nursery member of FIG. 1.
Figure 3:
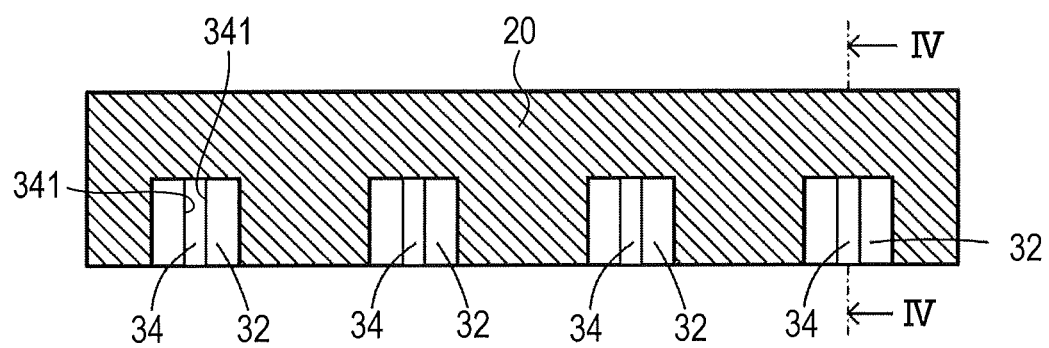
FIG. 3 is a cross-sectional view taken along line of the seedling nursery member of FIG. 1.
Figure 4:
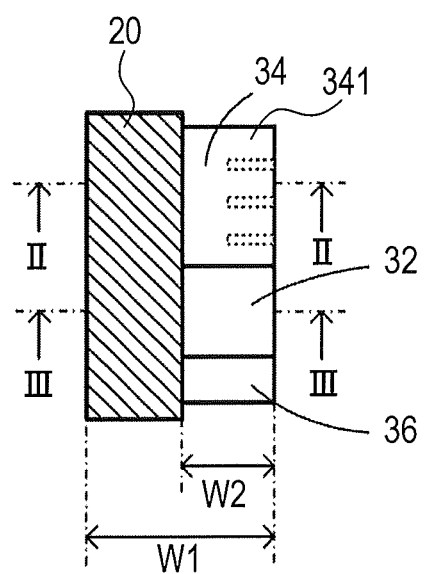
FIG. 4 is a cross-sectional view taken along line IV-IV of the seedling nursery member of FIG. 1.
Figure 5:
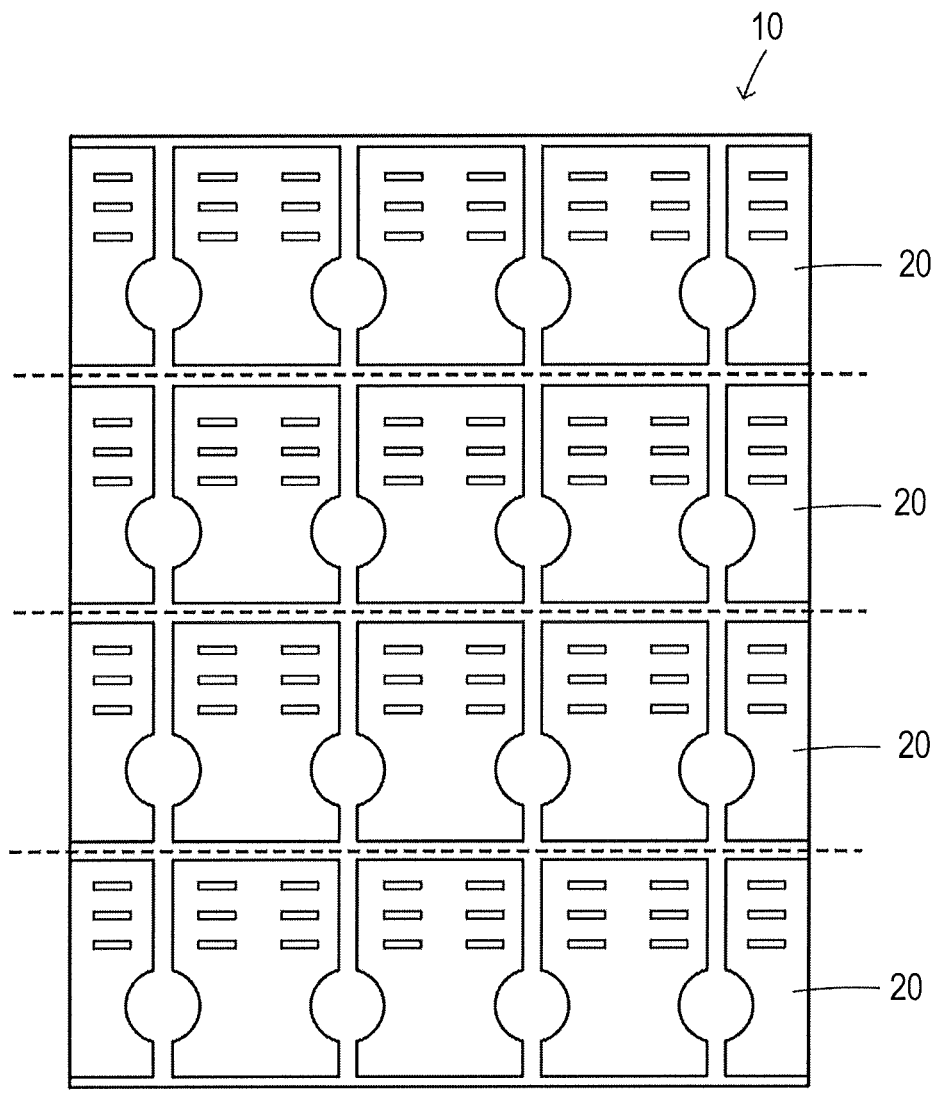
FIG. 5 is a plan view showing a configuration of a seedling nursery member assembly.

FIG. 1 is a configuration diagram schematically showing a configuration of the seedling nursery member 20 for grafting. FIG. 2 is a cross-sectional view taken along line II-II of the seedling nursery member 20 for grafting of FIG. 1. FIG. 3 is a cross-sectional view taken along line III-III the seedling nursery member 20 for grafting of FIG. 1. FIG. 4 is a cross-sectional view taken along line IV-IV of the seedling nursery member 20 for grafting of FIG. 1. FIG. 5 is a configuration diagram schematically showing a configuration of a seedling nursery member assembly 10 for grafting. It should be noted that the directions in the description of the first embodiment are mere examples, and the present invention is not limited thereto.

As shown in FIGS. 1 to 4, the seedling nursery member 20 is formed of an elastically deformable flexible resin material such as silicon rubber typified by polydimethylsiloxane (PDMS), for example. The seedling nursery member 20 is formed in a plate shape. The seedling nursery member 20 is provided with a plurality of seedling nursery units 30. The plurality of seedling nursery units 30 are integrally formed. The plurality of seedling nursery units 30 are arranged side by side in a row in the horizontal direction.

Each of the seedling nursery units 30 has the seed storage section 32, the stem storage section 34, and a root storage section 36. The seed storage section 32 is formed so as to be depressed in a columnar shape from one main surface in the thickness direction of the seedling nursery member 20. A diameter φ of the seed storage section 32 is adjusted such that water-absorbing seeds are rotatable when germinating. For example, the diameter φ of the seed storage section may be a diameter comparable to the long diameter of the water-absorbing seed, or a diameter about 1.5 to 2 times as large as the long diameter.

The stem storage section 34 is formed so as to be depressed in a groove shape from one main surface of the seedling nursery member 20. The stem storage section 34 is formed to extend linearly upward from the seed storage section 32. One end (the tip opposite to the seed storage section 32 side) of the stem storage section 34 is open upward. The inner wall surfaces 341 on both sides of the stem storage section 34 have a function of holding an elongated stem of a plant from the both sides. That is, the inner wall surface 341 of the stem storage section 34 serves as a stem holder configured to hold the elongated stem of the plant.

A width d of the stem storage section 34 is adjusted such that cotyledons can pass therethrough. The width d of the stem storage section 34 may be, for example, about 1/10 to 1/2 of the diameter φ of the seed storage section 32. A length L1 of the stem storage section 34 may be any length as long as it is suitable for grafting. The length L1 of the stem storage section 34 may be, for example, about 1 to 3 times the diameter φ of the seed storage section 32.

The root storage section 36 is formed so as to be depressed in a groove shape from one main surface of the seedling nursery member 20. The root storage section 36 is formed to extend linearly from the seed storage section 32 downward (in a direction opposite to the stem storage section 34) with the same width d as the root storage section 36. One end (the tip opposite to the seed storage section 32 side) of the root storage section 36 is open downward. The width d of the root storage section 36 is adjusted such that roots can pass therethrough. The width d of the root storage section 36 may be, for example, about 1/10 to 1/2 of the diameter φ of the seed storage section 32. A length L2 of the root storage section 36 may be about twice the diameter φ of the seed storage section 32 since it suffices that roots extend downward.

A depth W2 of the seed storage section 32, the stem storage section 34 and the root storage section 36 is formed to be about half to 1/3 of a thickness W1 of the seedling nursery member 20. The depth W2 of the seed storage section 32, the stem storage section 34 and the root storage section 36 may be comparable to the diameter φ of the seed storage section 32 so that water-absorbing seeds are rotatable in at least the seed storage section 32 when germinating. In the seedling nursery member 20 of the first embodiment, the depth W2 of the seed storage section 32, the stem storage section 34, and the root storage section 36 is set to be equal to the diameter φ of the seed storage section 32.

In the seedling nursery member 20, the seed storage section 32, the stem storage section 34 and the root storage section 36 are formed so as to open on one main surface of the seedling nursery member 20. Three cutting marks 38a, 38b, and 38c having different distances from the seed storage section 32 are formed on both sides of the stem storage section 34 of each of the seedling nursery units 30 of the seedling nursery member 20.

In the seedling nursery member 20, the plurality of seedling nursery units 30 are arranged side by side in a predetermined direction such that the stem storage sections 34 of the respective seedling nursery units 30 are oriented in the same direction. In the first embodiment, all the stem storage sections 34 are oriented in the vertical direction. In the plurality of seedling nursery units 30, the stem storage sections 34 of the respective seedling nursery units 30 are arranged side by side at equal intervals in the horizontal direction.

As shown in FIG. 5, a seedling nursery member assembly 10 for grafting, in which the plurality of seedling nursery members 20 are arranged side by side in the vertical direction and are integrally formed, is cut at the position indicated by the broken line in the horizontal direction to obtain the seedling nursery member 20.

The size of the seedling nursery unit 30 differs depending on the type of a target seed. For example, in the case of *Arabidopsis thaliana* with a seed diameter of about 500 μm, the diameter φ of the seed storage section 32 may be 700 to 1200 μm (for example, 900 μm). The width d of the stem storage section 34 and the root storage section 36 may be 100 to 500 μm (for example, 250 μm). The length L1 of the stem storage section 34 may be 500 to 1500 μm (for example, 1000 μm). The length L2 of the root storage section 36 may be 100 to 1000 μm (for example, 500 μm).

On the other hand, in the case of tomatoes, eggplants, and the like, the diameter φ of the seed storage section 32 may be 3.5 to 7.5 mm (for example, 5.5 mm). The width d of the stem storage section 34 and the root storage section 36 may be 0.6 to 1.5 mm (for example, 1.0 mm). The lengths L1 and L2 of the root storage section 36 of the stem storage section 34 may be 5 to 15 mm (for example, 10 mm). The length L2 of the root storage section 36 may be 0 to 10 mm (for example, 1 mm).

For example, when the diameter φ of the seed storage section 32 is 900 μm, the width d of the stem storage section 34 and the root storage section 36 is 300 μm, the length L1 of the stem storage section 34 is 1000 μm, and the length of the root storage section 36 is 500 μm, the seedling nursery member assembly 10 for grafting is formed in such a manner that five seedling nursery members 20 for grafting in which four seedling nursery units 30 are arranged in the horizontal direction are connected in the vertical direction. Thus, the seedling nursery member assembly 10 for grafting having the size of 17 mm (horizontal direction)×16 mm (vertical direction) and having 20 seedling nursery units 30 is obtained.

Next, a method for producing a grafted seedling using the plurality of seedling nursery members 20 for grafting will be described.

In the method for producing a grafted seedling according to the first embodiment, as shown in FIGS. 6, 7, 8A to 8D, and 9A to 9C, there are performed a seedling raising process for storing seeds 50 of a plant 5 in the seed storage section 32 in the seedling nursery unit 30 of each of the seedling nursery members 20, germinating the plant 5 in the seed storage section 32, elongating a stem 51 of the plant 5 in the stem storage section 34, and holding the stem 51 of the plant 5 with a stem holder (the inner wall surfaces 341 on both sides of the stem storage section 34), and a grafting process for cutting the stem 51 of the plant 5 held by the stem holder (the inner wall surfaces 341 on both sides of the stem storage section 34) of the seedling nursery unit 30 of each of the seedling nursery members 20 and joining cut surfaces of the stem 51 of the plant 5 to obtain a grafted seedling 6. Hereinafter, details of the method for producing the grafted seedling 6 will be described.

Figure 6:
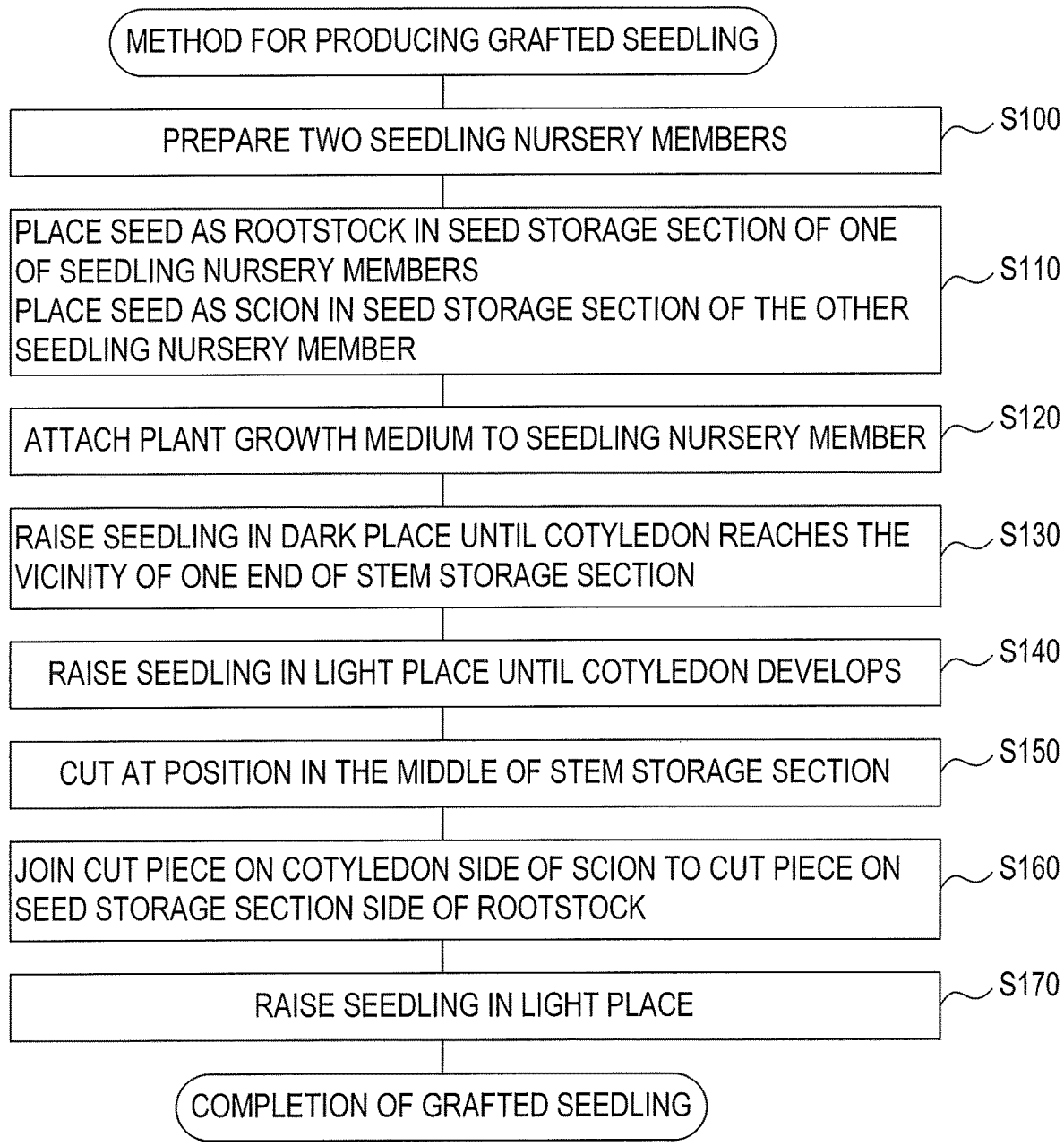
FIG. 6 is a process chart showing an example of a method for producing a grafted seedling using the seedling nursery member.

FIG. 6 is a process chart showing an example of the method for producing a grafted seedling using the seedling nursery member 20 for grafting. As shown in FIG. 6, in the production of a grafted seedling, first, two seedling nursery members 20 are prepared (step S100). Then, seeds of a plant (first plant) as a rootstock are sowed in each of the seed storage sections 32 of one of the seedling nursery members (first seedling nursery member) 20, and seeds of a plant (second plant) as a scion are sowed in each of the seed storage sections 32 of the other seedling nursery member (second seedling nursery member) 20 (step S110).

Then, a plant growth medium is attached to one main surface of the two seedling nursery members 20 (a surface on which the seed storage section 32 and the like of the seedling nursery unit 30 are formed) via a membrane filter (step S120). Then, the two seedling nursery members 20 are vertically erected together with the plant growth medium, and cotyledons are raised in a dark place until reaching the vicinity of one end (open end) of the stem storage section 34 (step S130). When the cotyledons reach the vicinity of one end (open end) of the stem storage section 34 without developing, the cotyledons are raised in a light place until the cotyledons develop (step S140). Consequently, the cotyledons develop.

Figure 7:
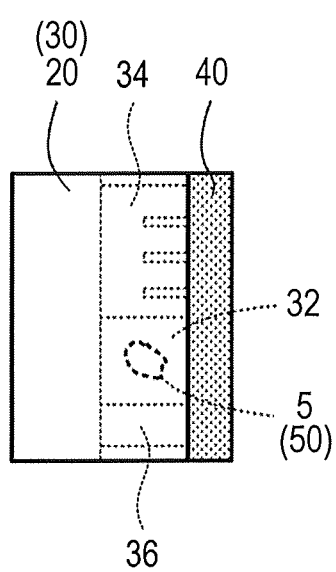
FIG. 7 is an explanatory view showing a state in which the seedling nursery member is vertically erected together with a plant growth medium.

Here, FIG. 7 shows a state when the seedling nursery member 20 is vertically erected together with a plant growth medium 40. The plant growth medium 40 is disposed so as to cover one main surface of the seedling nursery member 20 (so as to close respective opening portions of the seed storage section 32, the stem storage section 34 and the root storage section 36). Consequently, a direction where seeds of a plant are introduced and a direction where the plant growth medium 40 necessary for germination and growth of the plant is supplied are different from (orthogonal to) a direction where the plant grows, so that a configuration with excellent workability is provided. The seedling nursery member 20 is vertically erected together with the plant growth medium 40 because the plant 5 grows along the direction of gravity. Moreover, a seedling is raised in a dark place in order to elongate the stem (hypocotyl) to some extent without developing the cotyledons.

Figure 8:
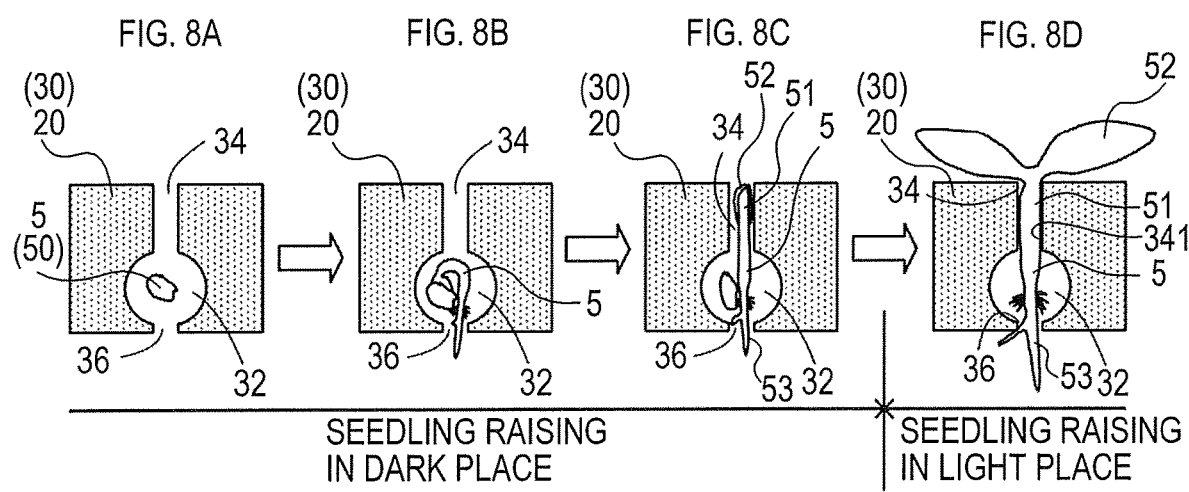
FIGS. 8A to 8D are explanatory views showing a state of nursery seedling in a seedling nursery unit.

FIGS. 8A to 8D show a state of seedling raising in the seedling nursery unit 30. When a seedling is raised in a dark place, the seed 50 (FIG. 8A) of the plant 5 sowed in the seed storage section 32 germinates (FIG. 8B). The stem 51 elongates in the stem storage section 34 without developing a cotyledon 52, and, at the same time, the root 53 elongates in the root storage section 36 (FIG. 8C). After that, the seedling is raised in a light place, so that the cotyledon 52 develops (FIG. 8D).

Then, as shown in FIG. 6, two seedling nursery members 20 are horizontally cut together with the seedling nursery member 20 at a position in the middle of the stem storage section 34 (for example, the position of the cutting mark 38b) (step S150). By such cutting, cut pieces (divided pieces) on the seed storage section 32 side of the seedling nursery member 20 in which the seeds of the plant as the rootstock are sowed become an array of the rootstocks, and cut pieces (divided pieces) on the cotyledon side of the seedling nursery member 20 in which the seeds of the plant as the scion are sowed become an array of scions.

Then, the array of the scions is placed on the array of the rootstocks so as to be aligned, and they are joined (step S160). Since both the array of the rootstocks and the array of the scions are obtained by horizontally cutting the same seedling nursery member 20 at the position in the middle of the stem storage section 34, the stem storage section 34 of the array of the rootstocks and the stem storage section 34 of the array of the scions are aligned only by placing the array of the scions on the array of the rootstocks, so that a cut surface of the stem of the plant as the rootstock and a cut surface of the stem of the plant as the scion are brought into contact with each other.

Figure 9:
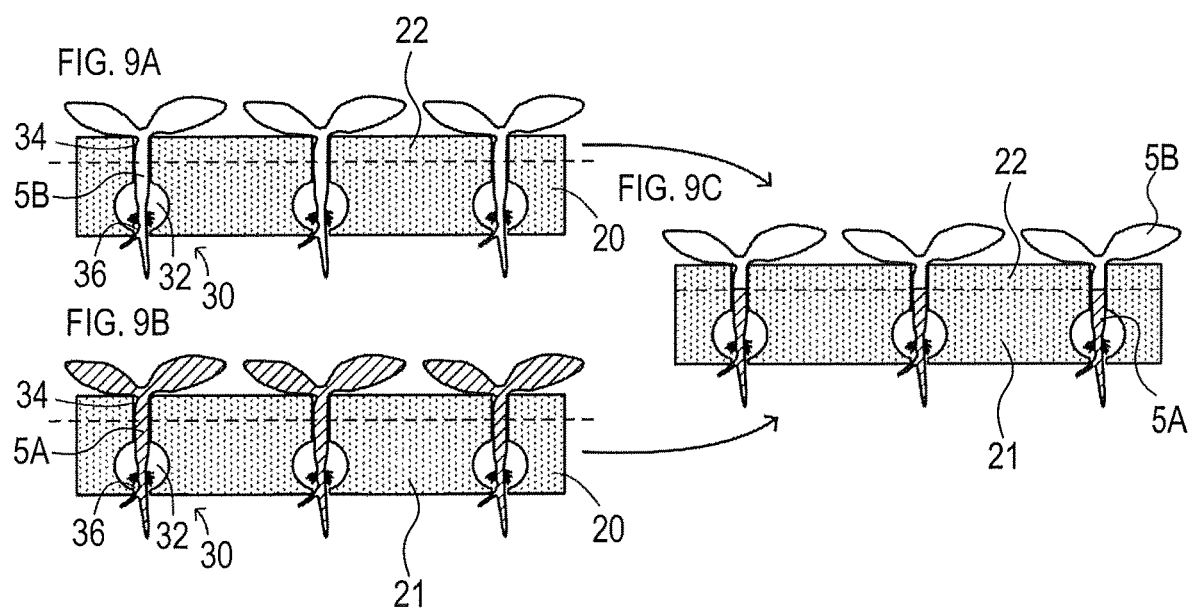
FIGS. 9A to 9C are explanatory views showing an example of a state of grafting using the seedling nursery member.

Here, FIGS. 9A to 9C show an example of a state of grafting using the two seedling nursery members 20. As illustrated, the seedling nursery member 20 (FIG. 9B) in which seeds of a plant 5A as a rootstock are sowed and the seedling nursery member 20 (FIG. 9A) in which seeds of a plant 5B as a scion are sowed are horizontally cut at the position in the middle of the stem storage section 34. Then, an array 22 of scions (cut pieces on the cotyledon side in FIG. 9A) is placed on an array 21 of rootstocks (cut pieces on the seed storage section 32 side in FIG. 9B). Consequently, a cut surface of the stem of the rootstock is brought into contact with a cut surface of the stem of the scion, and thereby grafting is carried out (FIG. 9C).

Thereafter, as shown in FIG. 6, a seedling is raised in a light place (with weak light) in the state where the cut surface of the stem of the rootstock is in contact with the cut surface of the stem of the scion (step S170). Consequently, the cut surface of the stem of the rootstock and the cut surface of the stem of the scion are joined to obtain a grafted seedling. Thus, the production of the grafted seedling is completed.

In the first embodiment, as the seedling nursery unit 30, two pairs of the seedling nursery members 20 were prepared in which the diameter φ of the seed storage section 32 was 900 μm, the width d of the stem storage section 34 and the root storage section 36 was 250 μm, the length L1 of the stem storage section 34 was 1000 μm, and the length L2 of the root storage section 36 was 500 μm, and grafting was carried out using *Arabidopsis thaliana* as rootstocks and scions.

Seeds were sowed in the seed storage section 32 of the seedling nursery unit 30, and the plant growth medium 40 was attached thereto. A seedling was raised in a dark place, so that the cotyledon reached the vicinity of one end (open end) of the stem storage section 34 in two days. After that, when the seedling was raised in a light place in one to two days, the cotyledon developed. As described above, the seedling nursery member 20 was horizontally cut at the position in the middle of the stem storage section 34, and the array of the scions was aligned and placed on the array of the rootstocks to be grafted. It was found that grafting was established in about a week. In the establishment of grafting, re-contact of a vascular bundle was confirmed by injecting a tracer dye of thin plastic transport into leaves, observing roots, and detecting the fluorescence of the dye from the roots. It was also confirmed that grafted *Arabidopsis thaliana* plants formed next generation seeds.

Then, the operational advantages of the seedling nursery member 20 for grafting of the first embodiment and the method for producing a grafted seedling using the seedling nursery member 20 will be described.

The seedling nursery member 20 for grafting of the first embodiment includes the plurality of seedling nursery units 30. Each of the seedling nursery units 30 has a simple structure including the seed storage section 32, the stem storage section 34, and the stem holder (the inner wall surface 341 of the stem storage section 34). Thus, it is possible to easily prepare a plant body (seedling for grafting) to be grafted using the seedling nursery member 20. In particular, since the seedling nursery unit 30 includes the stem holder (the inner wall surface 341 of the stem storage section 34), it is possible to easily prepare seedlings for grafting in a state where the stems are held by the stem holder (the inner wall surface 341 of the stem storage section 34).

For example, in the seedling nursery member 20 of the first embodiment, it is possible to obtain an array of rootstocks in which a plurality of rootstocks are arranged in a row and an array of scions in which a plurality of scions are arranged in a row. Further, a plurality of grafted seedlings arranged in a row can be obtained by simply aligning and placing the array of scions on the array of the rootstocks. In this way, it is possible to perform grafting accurately with simple and mechanical work. Accordingly, anyone can easily produce uniform grafted seedlings with high accuracy, and the productivity and quality of the grafted seedlings can be improved.

The seedling nursery member 20 (the seedling nursery unit 30) can be prepared with a simple structure. Thus, many seedling nursery members 20 can be prepared. Consequently, a large amount of grafted seedlings can be produced using the seedling nursery members 20. Since the size of the seedling nursery member 20 and the like can be easily adjusted according to a plant body to be grafted, grafting can be easily carried out regardless of the size of a plant ranging from smallest to largest and regardless of the growth stage ranging from a young seedling immediately after germination to a growing plant body.

By using the seedling nursery member 20, preparation for seedling raising becomes easy, and, at the same time, it is possible to save a space for a seedling raising site. Further, a plant growing period can be shortened. Consequently, growing cost can be reduced. If young plants (especially young plants of small sizes that cannot be handled with bare hands) are targeted, it is possible to reduce the growing cost due to shortening of the growing periods and reduce the transportation cost due to small-sized grafted seedlings.

A portion of the seed storage section 32 of each of the seedling nursery units 30 is configured to be openable to the outside of the seed storage section 32. Thus, seeds of a plant can be easily introduced into the seed storage section 32 through an opening portion of the seed storage section 32. Consequently, it is not necessary to introduce the seeds of the plant from the stem storage section 34, so that the inner diameter of the stem storage section 34 can be set according to the diameter of the stem of the plant. Further, the plant growth medium 40 necessary for germination and growth of plants can be supplied to the seed storage section 32 (specifically, seeds of a plant stored in the seed storage section 32) through the opening portion of the seed storage section 32, so that the plants can be easily and smoothly grown.

A portion of the stem storage section 34 of each of the seedling nursery units 30 is configured to be openable to the outside of the stem storage section 34. Thus, the plant growth medium 40 necessary for germination and growth of plants can be supplied to the stem storage section 34 (specifically, stems of a plant stored in the stem storage section 34) through the opening portion of the stem storage section 34, so that the plants can be easily and smoothly grown. Further, it is possible to extend a stem of a plant and to develop cotyledons, primary leaves and the like outside the seedling nursery unit 30, so that the plant can be easily and smoothly grown.

Further, by using the plant growth medium 40 such as an agar medium, it is possible to greatly reduce the size of the seedling nursery member 20 and to easily prepare the seedling nursery member 20 of a desired shape as compared with a case using soil of large granules or the like. Furthermore, by using the seedling nursery member 20 with a small size, it is possible to position (determine coordinates of) seedlings for grafting (for example, cut surfaces of plant stems) on a micrometer order, so that grafting can be carried out with high accuracy. Thus, it is possible to easily and accurately carry out grafting of young plants, which has been conventionally difficult.

A stem of a plant that has germinated and elongated can be immediately held by the stem holder (the inner wall surface 341 of the stem storage section 34) of the seedling nursery unit 30, so that grafting can be carried out immediately after cotyledons, primary leaves, and the like appear outside the seedling nursery unit 30 through the opening portion of the stem storage section 32. Consequently, young plants after germination can be immediately grafted.

The seedling nursery unit 30 further has the root storage section 36 in addition to the seed storage section 32 and the stem storage section 34. Thus, the roots of the plants can be elongated in the root storage section 36. Consequently, the plant can be easily and smoothly grown.

One end of the root storage section 36 of the seedling nursery unit 30 opens to the outside. Thus, the roots of plants can be further elongated outside the seedling nursery unit 30. Consequently, the plant can be easily and smoothly grown.

The seedling nursery unit 30 has a plate shape. Thus, it is possible to reduce the size of the seedling nursery unit 30 and further reduce the entire size of the seedling nursery member 20. In addition, downsizing of the seedling nursery member 20 can save a space for a seedling raising site.

The seedling nursery unit 30 has a plate shape, and the seed storage section 32, the stem storage section 34 and the root storage section 36 are formed so as to open on one main surface. Thus, it becomes easy to introduce seeds into the seed storage section 32, supply the plant growth medium 40 to the seed storage section 32, the stem storage section 34, and the root storage section 36, and take out a grafted seedling after grafting.

The seedling nursery member 20 (the seedling nursery unit 30) is formed of an elastically deformable material. Thus, it is possible to hold a plant having grown in the seedling nursery unit 30. When a portion (specifically, the inner wall surface 341) of the stem storage section 34 is allowed to function as a stem holder, the stem of the growing plant can be held. Consequently, even when the stem of the plant in the stem storage section 34 of the seedling nursery unit 30 is cut together with the seedling nursery member 20, the stem of the plant can be held in the stem storage section 34. Since the seedling nursery unit 30 can be deformed flexibly in accordance with the growth of the plant, it is possible to enhance the adhesion with the plant and easily hold the stem of the plant, and it is also possible to obtain an effect of preventing inhibition of the growth of the plant.

The seedling nursery member 20 is provided with the plurality of seedling nursery units 30. Thus, a larger amount of grafted seedlings can be produced using the seedling nursery member 20. Consequently, it is possible to further improve the productivity of grafted seedlings.

The seedling nursery members 20 (the plurality of seedling nursery units 30) are integrally configured. Thus, it is possible to simplify the structure of the seedling nursery member 20. Further, the grafting operation using the plurality of seedling nursery members 20 is facilitated.

The plurality of seedling nursery units 30 are arranged side by side in a predetermined direction such that the stem storage sections 34 of the respective seedling nursery units 30 are oriented in the same direction. Thus, the grafting operation using the plurality of seedling nursery members 20 (in particular, cutting of stems of plants and joining of cut surfaces of the plant stems) is facilitated.

In the plurality of seedling nursery units 30, the stem storage sections 34 of the respective seedling nursery units 30 are arranged side by side at equal intervals. Thus, the grafting operation using the plurality of seedling nursery members 20 (in particular, cutting of stems of plants and joining of cut surfaces of the plant stems) is facilitated.

The seedling nursery member 20 is intended for use in grafting of young plants (especially young plants of small sizes that cannot be handled with bare hands). Thus, it is possible to reduce the growing cost due to shortening of the growing periods and reduce the transportation cost due to small-sized grafted seedlings. Moreover, it is possible to effectively exercise the above-described effect that it is possible to graft even plants that are difficult to be grafted with human hands so far because they are too small.

The method for producing a grafted seedling according to the first embodiment is carried out using the plurality of seedling nursery members 20 for grafting. Thus, as described above, grafting can be easily carried out with high accuracy, and a grafted seedling can be easily produced with high accuracy. Further, anyone can easily produce uniform grafted seedlings with high accuracy, and the quality of the grafted seedlings can be improved. Furthermore, the growing cost and transportation cost can be reduced.

In the method for producing a grafted seedling according to the first embodiment, in the grafting process, the stem of the plant held by the stem holder (the inner wall surface 341 of the stem storage section 34) of the seedling nursery unit 30 of each of the seedling nursery members 20 is cut, each of the seedling nursery members 20 is divided (cut) into a plurality of portions to form a plurality of divided pieces (cut pieces), and the divided pieces (cut pieces) of each of the seedling nursery members 20 are arranged such that cut surfaces of the stems of the plant are in contact with each other. Thus, the grafting operation in the grafting process (in particular, joining of the cut surfaces of the plant stems) is facilitated.

In the seedling raising process, the seedling nursery member 20 is placed in a dark place until the cotyledon of the plant reaches one end (open end) of the stem storage section 34, and thereafter, the seedling nursery member 20 is placed in a light place. That is, by placing the seedling nursery member 20 in the dark place, the stem can be sufficiently elongated without developing cotyledons in the stem storage section 34, and the stem can be disposed properly in the stem storage section 34. Further, by placing the seedling nursery member 20 in the light place, the cotyledons are developed outside the stem storage section 34, and the stem grows thickly, conforms to the stem storage section 34, and is held by the stem holder (the inner wall surface 341 of the stem storage section 34). Consequently, the plant can be easily and smoothly grown.

Thus, according to the first embodiment, it is possible to provide the seedling nursery member 20 for grafting and the seedling nursery set, that make it possible to easily produce grafted seedlings regardless of the size and growth stage of a plant body to be grafted and to improve the productivity and quality of grafted seedlings and reduce the cost, and a method for producing a grafted seedling.

Second Embodiment

The second embodiment is an example of a method for producing a grafted seedling using three seedling nursery members 20 for grafting as shown in FIG. 10 and FIGS. 11A to 11D. It should be noted that descriptions of the same configurations, methods and operational advantages as those of the first embodiment are appropriately omitted.

Figure 10:
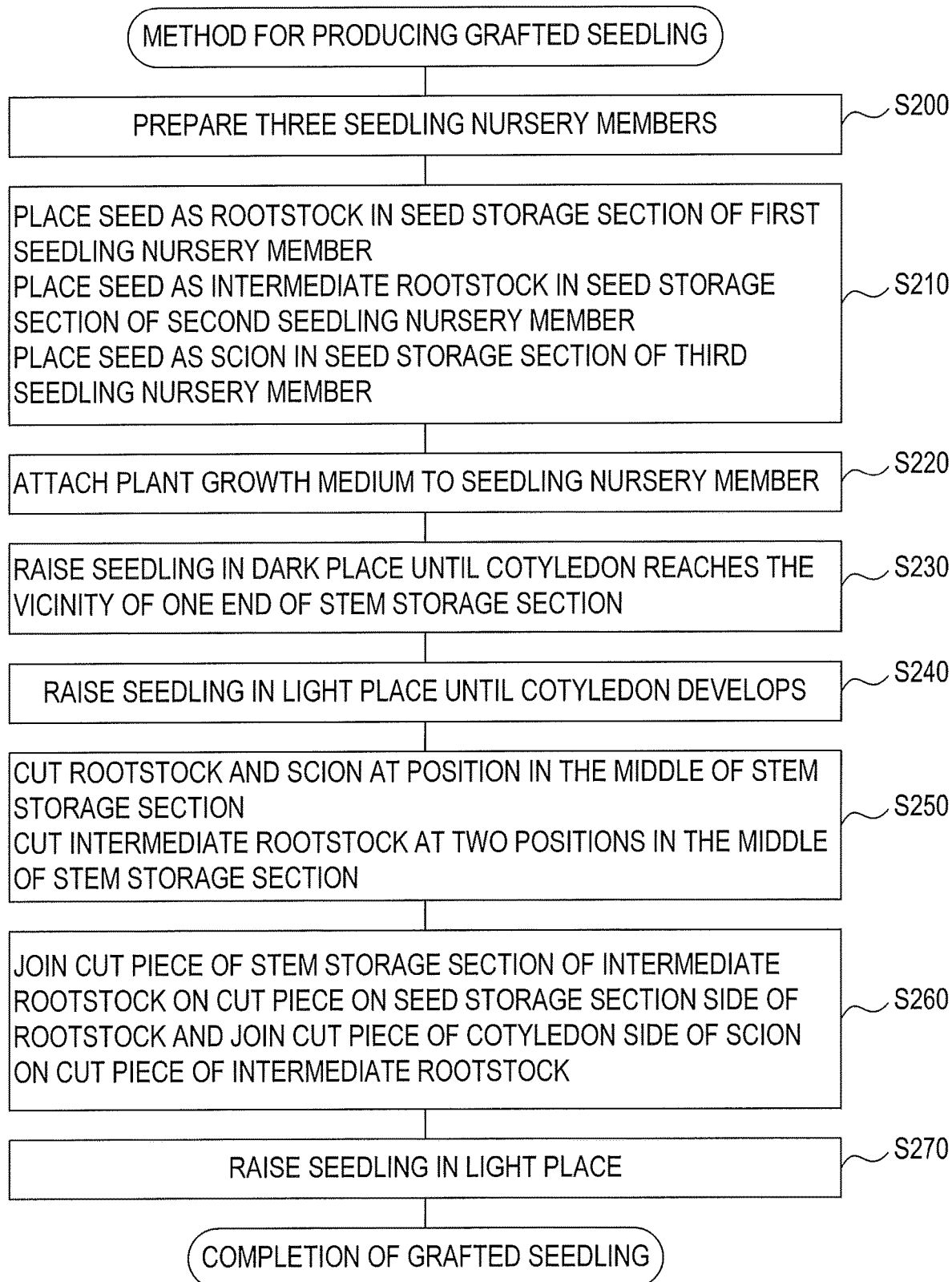
FIG. 10 is a process chart showing another example of a method for producing a grafted seedling using the seedling nursery member.

FIG. 10 is a process chart showing an example of a method for producing a grafted seedling using the seedling nursery member 20. As shown in FIG. 10, in the method for producing a grafted seedling, first, three seedling nursery members 20 are prepared (step S200). That is, a seedling nursery set including three sets of the seedling nursery members 20 is prepared. Then, seeds of a plant (first plant) as a rootstock are sowed in each seed storage section 32 of a first seedling nursery member 20. Further, seeds of a plant (second plant) as an intermediate rootstock are sowed in each seed storage section 32 of a second seedling nursery member 20. Furthermore, seeds of a plant (third plant) as a scion are sowed in each seed storage section 32 of a third seedling nursery member 20 (step S210).

Then, a plant growth medium 40 is attached to one main surface of the three seedling nursery members 20 (a surface on which the seed storage section 32 and the like of a seedling nursery unit 30 are formed) via a membrane filter (step S220). Then, the three seedling nursery members 20 are vertically erected together with the plant growth medium 40, and cotyledons are raised in a dark place until reaching the vicinity of one end (open end) of a stem storage section 34 (step S230). When the cotyledons reach the vicinity of one end (open end) of the stem storage section 34 without developing, the cotyledons are raised in a light place until the cotyledons develop (step S240). Consequently, the cotyledons develop.

Then, the first seedling nursery member 20 is horizontally cut together with the seedling nursery member 20 at a position in the middle of the stem storage section 34 (for example, a position of a cutting mark 38c). Further, the second seedling nursery member 20 is horizontally cut together with the seedling nursery member 20 at two positions in the middle of the stem storage section 34 (for example, positions of cutting marks 38a and 38c). Furthermore, the third seedling nursery member 20 is horizontally cut together with the seedling nursery member 20 at a position in the middle of the stem storage section 34 (for example, the position of the cutting mark 38a) (step S250).

By such cutting, cut pieces (divided pieces) on the seed storage section 32 side of the first seedling nursery member 20 in which the seeds of the plant as the rootstock are sowed become an array of the rootstocks. Further, cut pieces (divided pieces) of a portion of the stem storage section 34 of the second seedling nursery member 20 in which the seeds of the plant as the intermediate rootstock are sowed become an array of the intermediate rootstocks. Furthermore, cut pieces (divided pieces) on the cotyledon side of the third seedling nursery member 20 in which the seeds of the plant as the scion are sowed become an array of the scions.

Then, the array of the intermediate rootstocks is aligned and placed on the array of the rootstocks, and, at the same time, the array of the scions is aligned and placed on the array of the intermediate rootstocks and joined (step S260). The array of the rootstocks, the array of the intermediate rootstocks, and the array of the scions are obtained by horizontally cutting the same seedling nursery member 20 at the position in the middle of the stem storage section 34, so that only by aligning and placing the intermediate rootstock array on the rootstock array and at the same time aligning and placing the scion array on the intermediate rootstock array, the stem storage section 34 of the rootstock array and the stem storage section 34 of the intermediate rootstock array are aligned, and, at the same time, the stem storage section 34 of the intermediate rootstock array and the stem storage section 34 of the scion array are aligned. Thus, a cut surface of the stem of the rootstock and a cut surface of the stem of the intermediate rootstock are in contact with each other, and, at the same time, the cut surface of the stem of the intermediate rootstock and a cut surface of the stem of the scion are in contact with each other.

Figure 11:
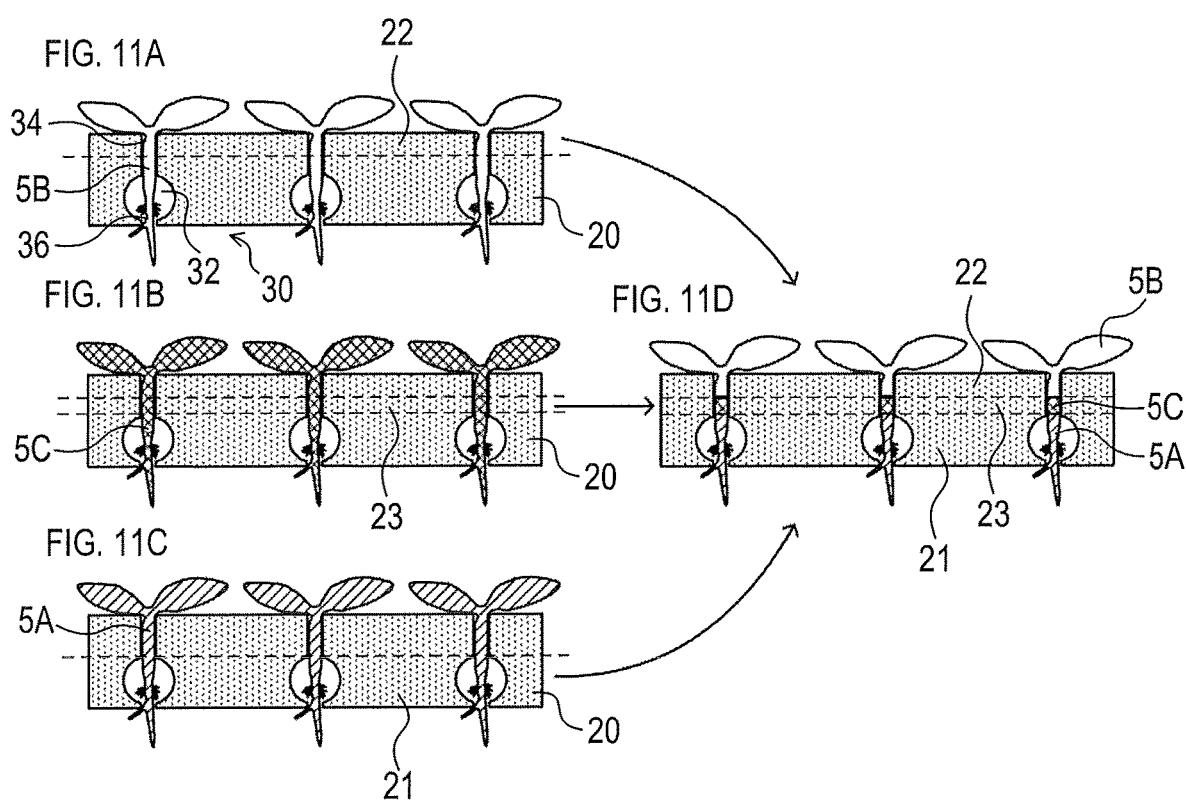
FIGS. 11A to 11D are explanatory views showing an example of a state of grafting using the seedling nursery member.

Here, FIGS. 11A to 11D show an example of a state of grafting using the three seedling nursery members 20. As illustrated, the first seedling nursery member 20 (FIG. 11C) in which seeds of a plant 5A as a rootstock are sowed, the second seedling nursery member 20 (FIG. 11B) in which seeds of a plant 5C as an intermediate rootstock are sowed, and the third seedling nursery member 20 (FIG. 11A) in which seeds of a plant 5B as a scion are sowed are horizontally cut at the position indicated by the broken line in the middle of the stem storage section 34. Then, an array 23 of intermediate rootstocks (cut pieces between the two broken lines in FIG. 11B) is placed on an array 21 of rootstocks (cut pieces on the seed storage section 32 side in FIG. 11C), and an array 22 of scions (cut pieces on the cotyledon side in FIG. 11A) is placed on the intermediate rootstock array 23. Consequently, the cut surface of the stem of the rootstock and a lower cut surface of the stem of the intermediate rootstock are brought into contact with each other, and, at the same time, an upper cut surface of the stem of the intermediate rootstock and the cut surface of the stem of the scion are brought into contact with each other, so that grafting is carried out (FIG. 11D).

Thereafter, as shown in FIG. 10, seedling are raised in a light place in the state in which the cut surface of the stem of the rootstock, the cut surface of the stem of the intermediate rootstock, and the cut surface of the stem of the scion are in contact with each other (step S270). Consequently, the cut surfaces are joined to each other, and grafted seedlings are obtained. Thus, the production of the grafted seedling is completed. As the intermediate rootstock, *Nicotiana* or the like capable of being grafted with a broad variety of plants can be used.

In the second embodiment, since the intermediate rootstock is used, a degree of freedom of combination of the rootstock with the scion can be increased. If *Nicotiana* or the like capable of being grafted with a broad variety of plants is used as an intermediate rootstock, plants incompatible with each other can be grafted by interposing the intermediate rootstock.

In the second embodiment, three plants are grafted simultaneously. However, for example, after two plants are grafted, the grafted plants and other plants may be grafted. That is, a plural number of times of grafting operations may be performed. This also applies to grafting of four or more plants.

Third Embodiment

Figure 12:
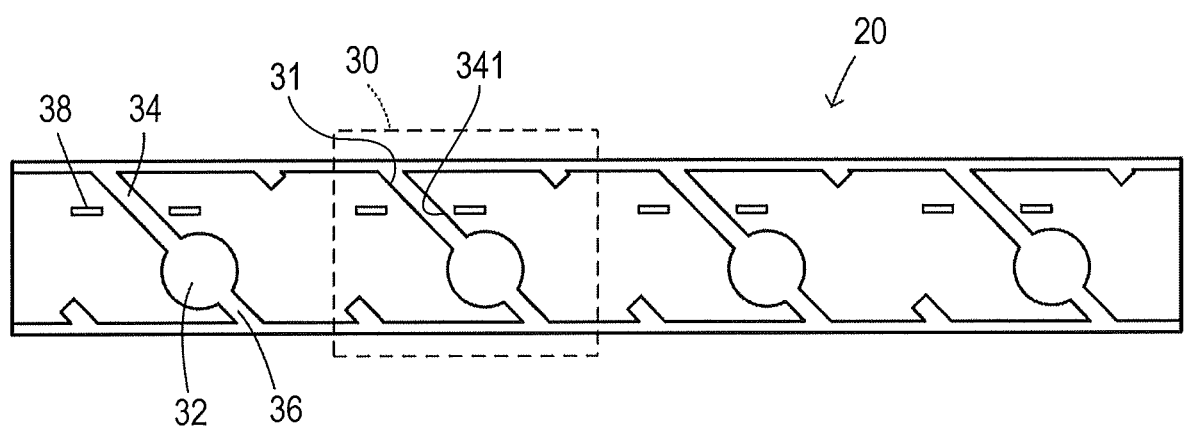
FIG. 12 is a plan view showing a configuration of a seedling nursery member of another example.
Figure 13:
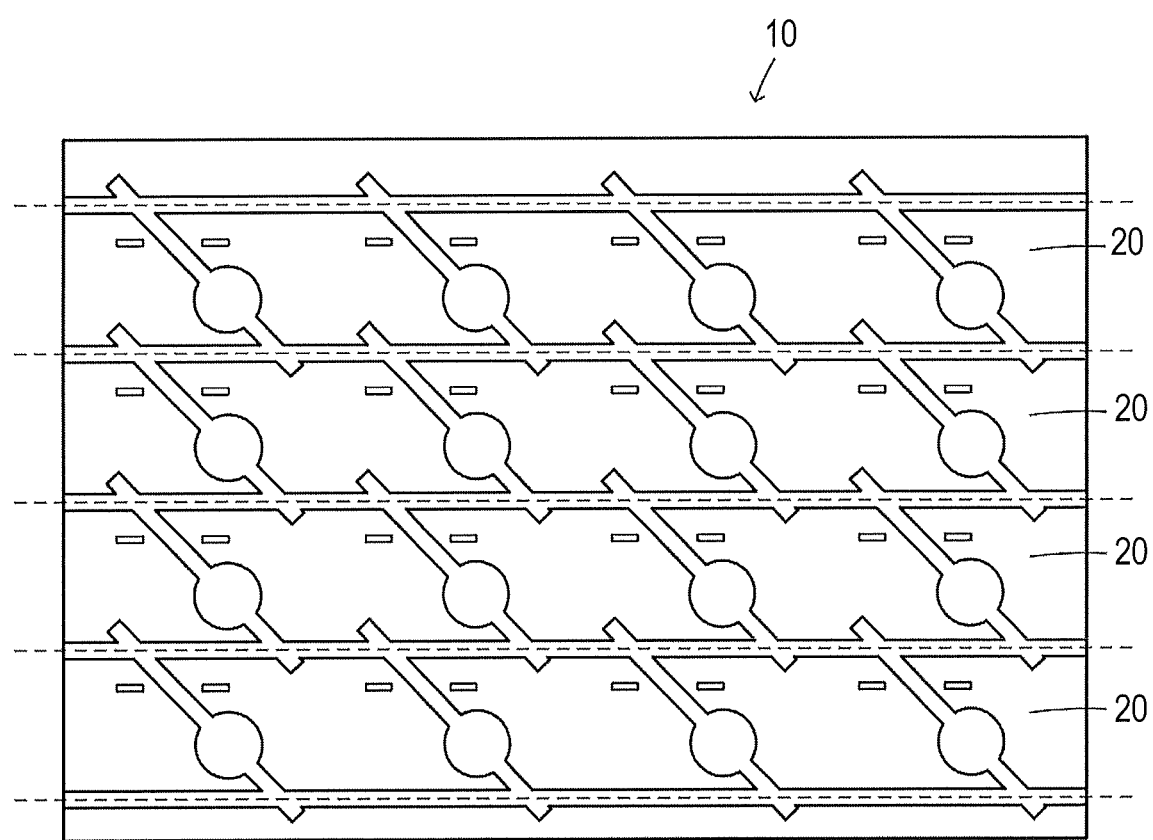
FIG. 13 is a plan view showing a configuration of a seedling nursery member assembly of another example.

The third embodiment is an example in which the configuration of the seedling nursery member 20 (seedling nursery unit 30) for grafting is changed as shown in FIGS. 12 and 13. It should be noted that descriptions of the same configurations, methods and operational advantages as those of the first embodiment are appropriately omitted.

As shown in FIG. 12, the seedling nursery member 20 is configured such that the plurality of seedling nursery units 30 in each of which a stem storage unit 34 and a root storage unit 36 are formed from a seed storage unit 32 so as to be inclined relative to a horizontal plane (for example, in a range of an inclination angle of 30° to 60°) are horizontally arranged in a row. In this case, by cutting along cutting marks 38 formed horizontally on both sides of the stem storage section 34, it is possible to obtain an array of rootstocks with stems cut obliquely and an array of scions with stems cut obliquely at the same angle as the cutting angle of the rootstock, and a grafted seedling of the rootstock and the scion with stems cut obliquely can be obtained. At this time, it is preferable to carry out seedling raising such that the stem storage section 34 and the root storage section 36 of the seedling nursery unit 30 are in the vertical direction.

The seedling nursery member 20 can be obtained by cutting a seedling nursery member assembly 110 exemplified in FIG. 13 with a broken line. Even with such a seedling nursery member 20, a grafted seedling provided by a rootstock and a scion can be produced using the two seedling nursery members 20, or a grafted seedling provided by a rootstock, an intermediate rootstock, and a scion can be produced using the three seedling nursery members 20.

Fourth Embodiment

Figure 14A:
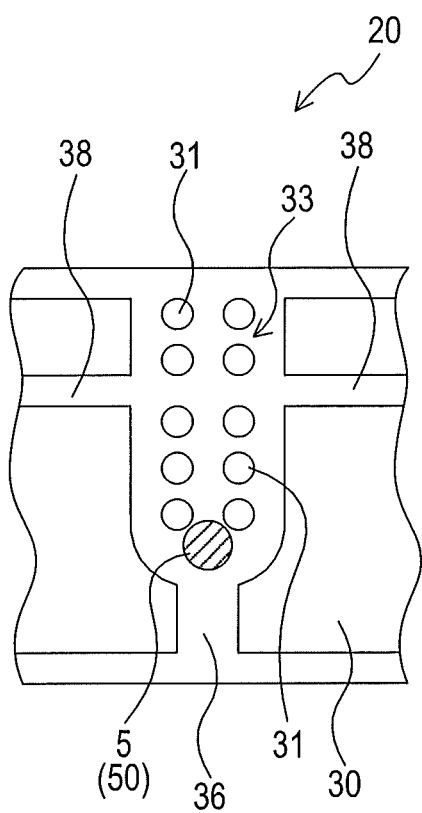
FIGS. 14A and 14B are plan views showing a configuration of the seedling nursery member and a state of nursery seedling using the seedling nursery member.
Figure 14B:
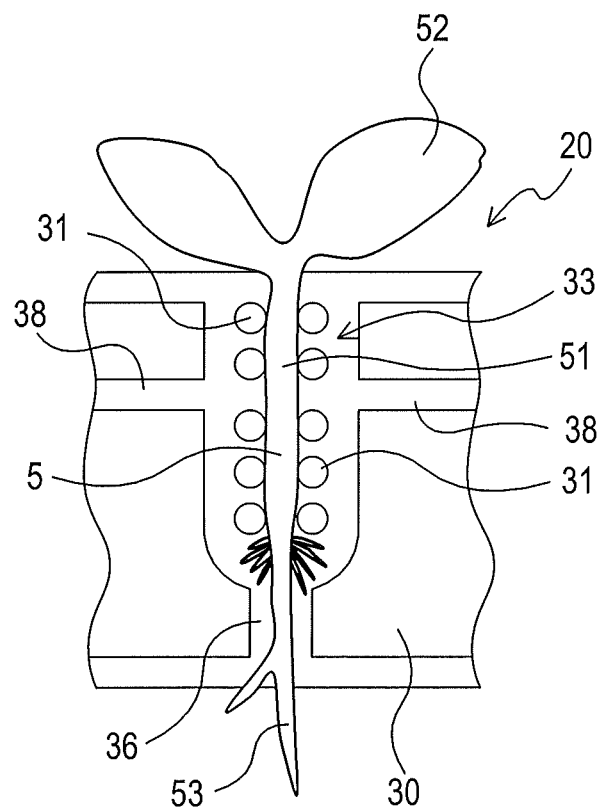

The fourth embodiment is an example in which the configuration of the seedling nursery member 20 (seedling nursery unit 30) for grafting is changed as shown in FIGS. 14A and 14B. It should be noted that descriptions of the same configurations, methods and operational advantages as those of the first embodiment are appropriately omitted.

As shown in FIG. 14A, the seedling nursery unit 30 of the seedling nursery member 20 has a seedling nursery section 33 in which a seed storage section and a stem storage section are integrated. The seedling nursery section 33 is formed so as to open on one main surface of the seedling nursery member 20. A plurality of columnar stem holders 31 formed so as to protrude from a bottom surface of the seedling nursery section 33 are provided in the seedling nursery section 33. Depressed groove-shaped cutting marks 38 are formed on both sides of the seedling nursery section 33. The cutting mark 38 is formed to be continuous to the seedling nursery section 33.

As shown in FIG. 14B, the stem holder 31 guides elongation of a stem 51 of a germinated plant 5 in the seedling nursery section 33 and holds the elongated stem 51. Consequently, the stem 51 of the elongated plant 5 can be sufficiently held by the stem holder 31.

Fifth Embodiment

The fifth embodiment is an example in which the configuration of the seedling nursery member 20 (seedling nursery unit 30) for grafting is changed as shown in FIGS. 15 to 18. It should be noted that descriptions of the same configurations, methods and operational advantages as those of the first embodiment are appropriately omitted.

The seedling nursery member 20 shown in FIGS. 15 to 18 differs from the first to fourth embodiments described above in which seedling raising is carried out in a dark place halfway and carried out in a light place from halfway. The seedling nursery member 20 is used when seedling raising is carried out in a light place from beginning to end.

Figure 15:
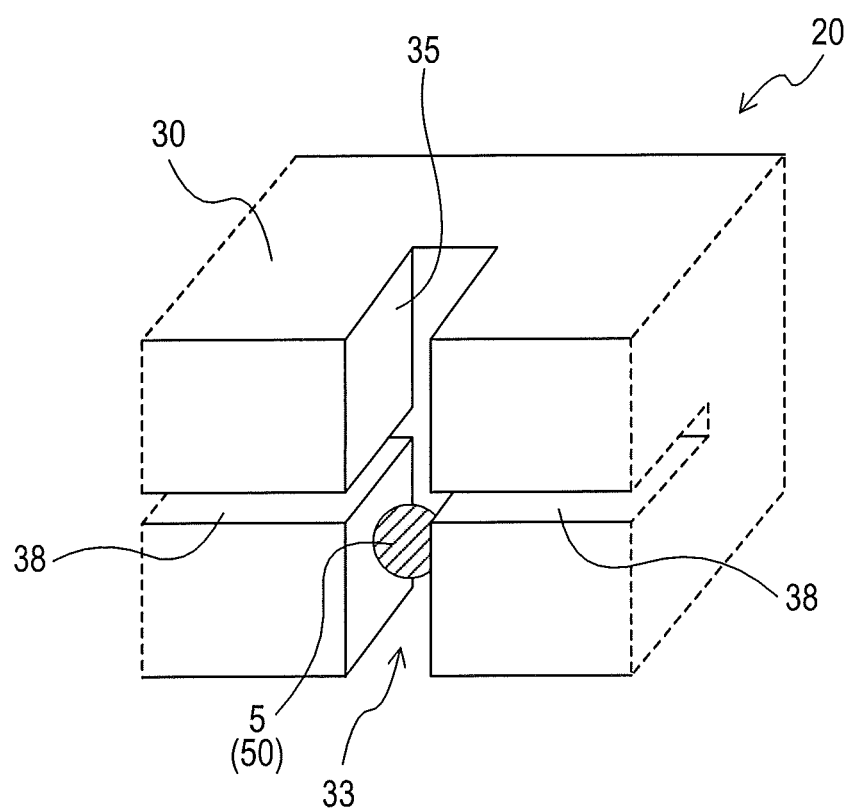
FIG. 15 is a perspective view showing a configuration of the seedling nursery member.

As shown in FIG. 15, the seedling nursery unit 30 of the seedling nursery member 20 has a seedling nursery section 33 in which a seed storage section, a stem storage section and a root storage section are integrated. The seedling nursery section 33 is a vertically elongated space and has a width that allows water-absorbing seeds 50 of a plant 5 to be rotatable when germinating, and the size is adjusted such that cotyledons can develop. Inner wall surfaces 35 on both sides of the seedling nursery section 33 have a function of guiding elongation of the stem of the germinated plant 5 and a function of a stem holder for holding the stem of the elongated plant 5. Depressed groove-shaped cutting marks 38 are formed on both sides of the seedling nursery section 33. The cutting mark 38 is formed to be continuous to the seedling nursery section 33.

Figure 16:
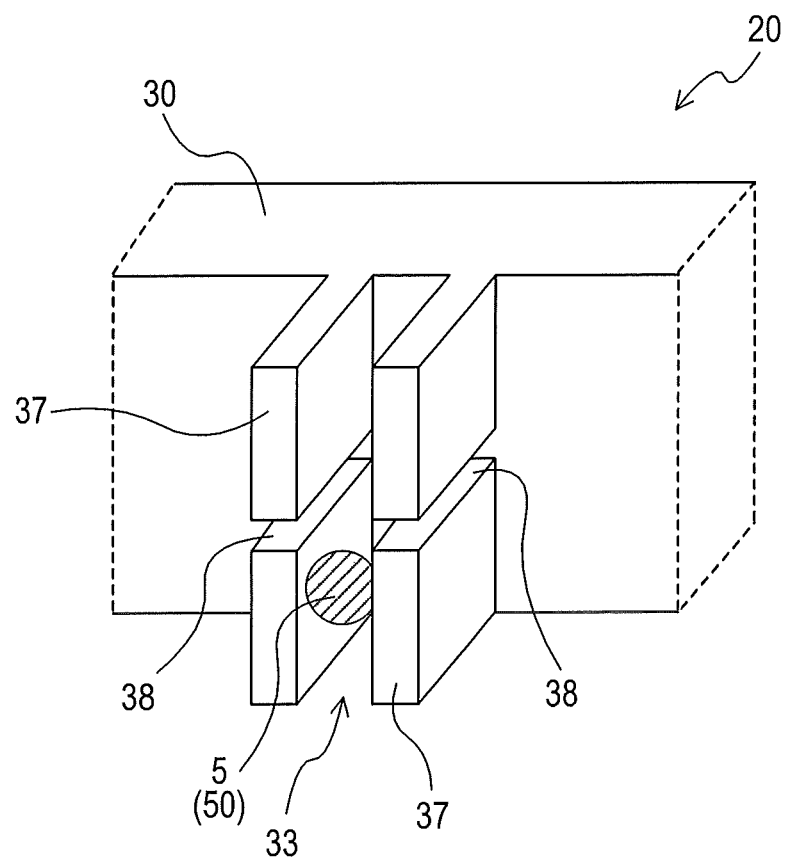
FIG. 16 is a perspective view showing a configuration of the seedling nursery member.

As shown in FIG. 16, the seedling nursery unit 30 of the seedling nursery member 20 has the seedling nursery section 33 in which a seed storage section, a stem storage portion and a root storage portion are integrated, and a pair of plate-shaped seedling nursery holders 37 formed so as to protrude from a bottom surface of the seedling nursery section 33 on both sides of the seedling nursery section 33. The seedling nursery section 33 is formed so as to open on one main surface side of the seedling nursery member 20. The seedling nursery section 33 is a vertically elongated space and is adjusted to have a width that allows the water-absorbing seeds 50 of the plant 5 to be rotatable when germinating. The seedling nursery holder 37 is easily elastically deformable. When cotyledon develops, the seedling nursery holder 37 elastically deforms so as not to obstruct the development of the cotyledon. The seedling nursery holder 37 has a function of guiding elongation of the stem of the germinated plant 5 and a function of a stem holder for holding the stem of the elongated plant 5. Depressed groove-shaped cutting marks 38 are formed on both sides (a pair of seedling nursery holders 37) of the seedling nursery section 33. The cutting mark 38 is formed to be continuous to the seedling nursery section 33.

Figure 17:
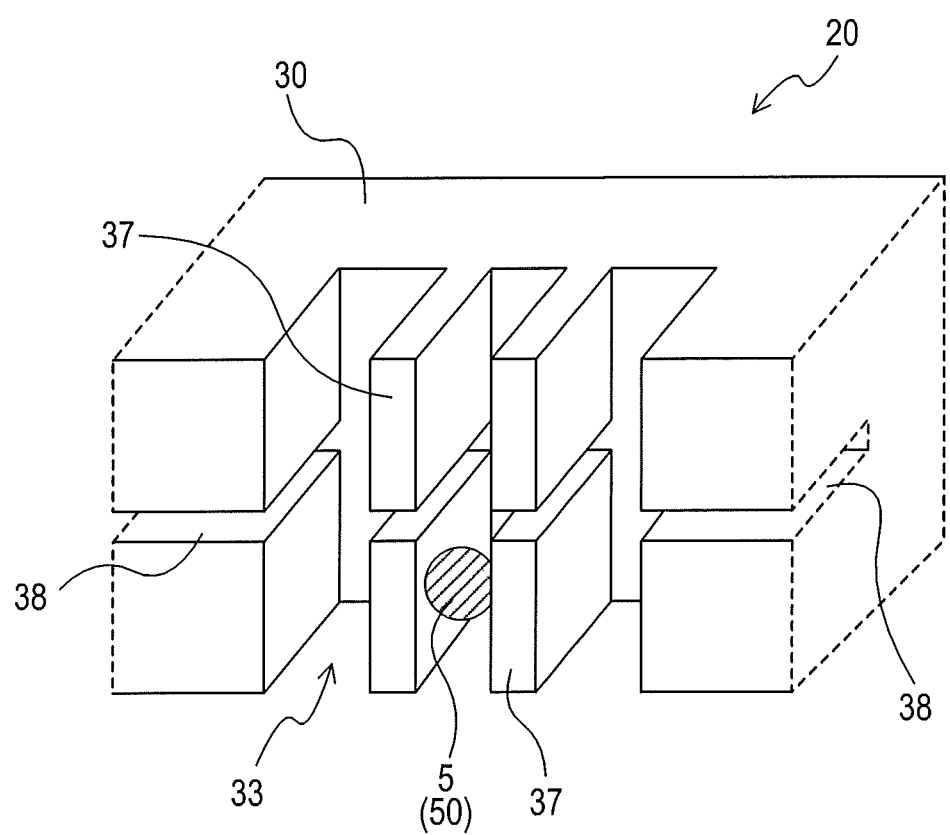
FIG. 17 is a perspective view showing a configuration of the seedling nursery member.

As shown in FIG. 17, the seedling nursery unit 30 of the seedling nursery member 20 has the seedling nursery section 33 in which the seed storage section, the stem storage section and the root storage section are integrated. The pair of plate-shaped seedling nursery holders 37 formed so as to protrude from the bottom surface of the seedling nursery section 33 are provided in the seedling nursery section 33. The distance (width) between the seedling nursery holders 37 is adjusted to a width that allows the water-absorbing seeds 50 of the plant 5 to be rotatable when germinating. The seedling nursery holder 37 is easily elastically deformable. When cotyledon develops, the seedling nursery holder 37 elastically deforms so as not to obstruct the development of the cotyledon. The seedling nursery holder 37 has a function of guiding elongation of the stem of the germinated plant 5 and a function of a stem holder for holding the stem of the elongated plant 5. Depressed groove-shaped cutting marks 38 are formed on both sides of the seedling nursery section 33 across the pair of seedling nursery holders 37. The cutting mark 38 is formed to be continuous to the seedling nursery section 33.

Figure 18:
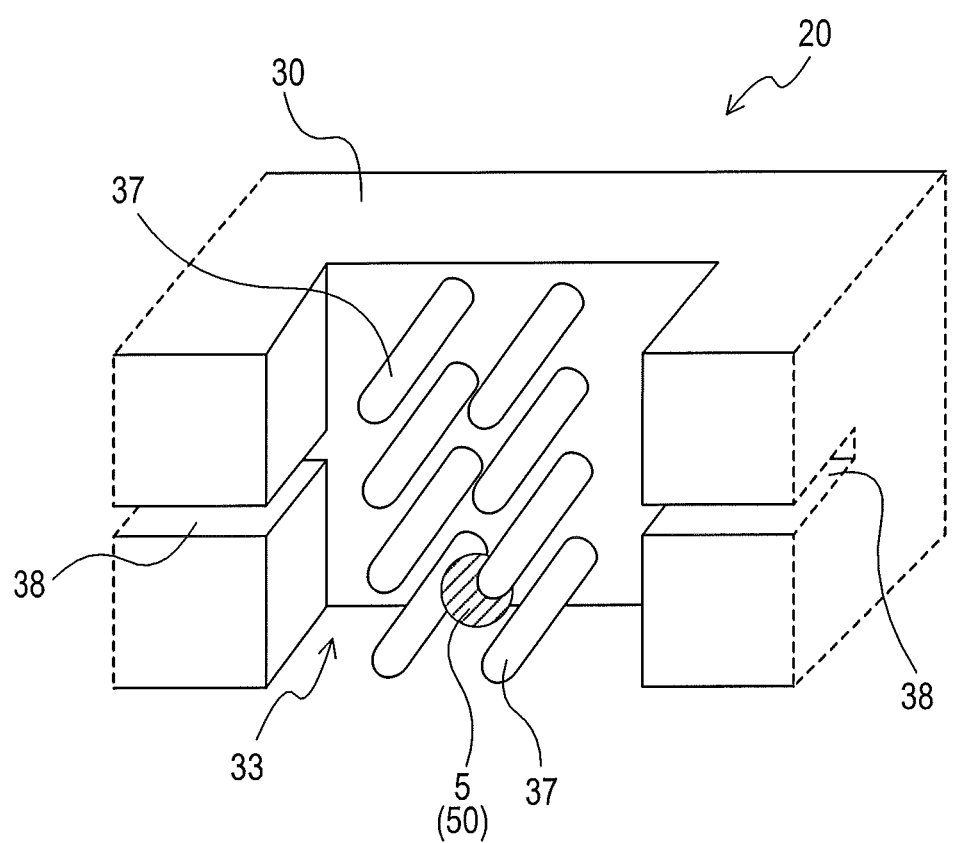
FIG. 18 is a perspective view showing a configuration of the seedling nursery member.

As shown in FIG. 18, the seedling nursery unit 30 of the seedling nursery member 20 has the seedling nursery section 33 in which the seed storage section, the stem storage section, and the root storage section are integrated. The plurality of columnar seedling nursery holders 37 formed so as to protrude from the bottom surface of the seedling nursery section 33 are provided in the seedling nursery section 33. The plurality of seedling nursery holders 37 are vertically arranged side by side in two rows. The distance (width) between the seedling nursery holders 37 is adjusted to a width that allows the water-absorbing seeds 50 of the plant 5 to be rotatable when germinating. The seedling nursery holder 37 is easily elastically deformable. When cotyledon develops, the seedling nursery holder 37 elastically deforms so as not to obstruct the development of the cotyledon. The seedling nursery holder 37 has a function of guiding elongation of the stem of the germinated plant 5 and a function of a stem holder for holding the stem of the elongated plant 5. Depressed groove-shaped cutting marks 38 are formed on both sides of the seedling nursery section 33. The cutting mark 38 is formed to be continuous to the seedling nursery section 33.

Sixth Embodiment

Figure 19:
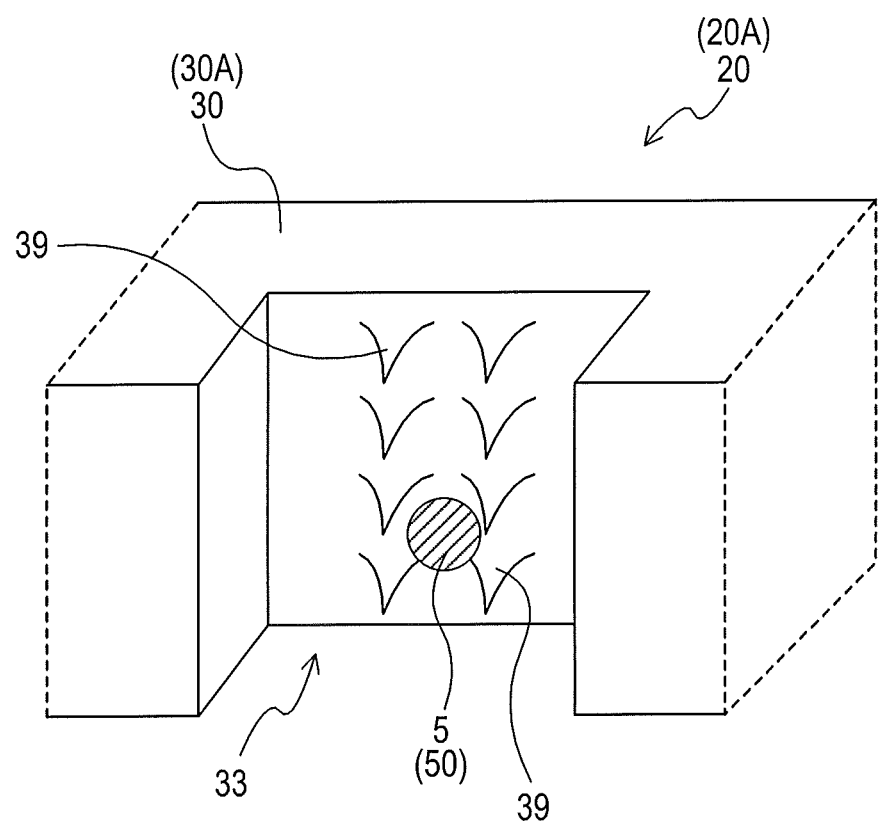
FIG. 19 is a perspective view showing a configuration of a first seedling nursery member of the seedling nursery member.

The sixth embodiment is an example in which the configuration of the seedling nursery member 20 (seedling nursery unit 30) for grafting is changed as shown in FIG. 19 and FIGS. 20A and 20B. It should be noted that descriptions of the same configurations, methods and operational advantages as those of the fifth embodiment are appropriately omitted.

As shown in FIG. 19 and FIGS. 20A and 20B, the seedling nursery member 20 is composed of two members including a first seedling nursery member 20A and a second seedling nursery member 20B. The seedling nursery unit 30 is composed of a first unit section 30A of the first seedling nursery member 20A and a second unit section 30B of the second seedling nursery member 20B.

As shown in FIG. 19, the first unit section 30A of the first seedling nursery member 20A has a seedling nursery section 33 in which a seed storage section, a stem storage section, and a root storage section are integrated. A plurality of conical seedling nursery guide sections 39 formed so as to protrude from a bottom surface of the seedling nursery section 33 are provided in the seedling nursery section 33. The plurality of seedling nursery guide sections 39 are vertically arranged side by side in two rows. The distance (width) between the seedling nursery guide sections 39 is adjusted to a width that allows water-absorbing seeds 50 of a plant 5 to be rotatable when germinating. The seedling nursery guide section 39 is easily elastically deformable. When cotyledon develops, the seedling nursery guide section 39 elastically deforms so as not to obstruct the development of the cotyledon. The seedling nursery holder 37 has a function of guiding elongation of the stem of the germinated plant 5.

As shown in FIG. 20A, the second unit section 30B of the second seedling nursery member 20B has the plurality of columnar seedling nursery holders 37. The plurality of seedling nursery holders 37 are vertically arranged side by side in two rows. The seedling nursery holder 37 is easily elastically deformable and has a function of a stem holder for holding the stem of the elongated plant 5.

In the production of grafted seedlings, as shown in FIG. 20A, the plant 5 is grown in the first unit section 30A of the first seedling nursery member 20A. Then, the plurality of seedling nursery holders 37 of the second unit section 30B of the second seedling nursery member 20B are pushed into the seedling nursery section 33 of the first unit section 30A of the first seedling nursery member 20A.

Then, as shown in FIG. 20B, by separating the second unit section 30B of the second seedling nursery member 20B from the first unit section 30A of the first seedling nursery member 20A, the second unit section 30B of the second seedling nursery member 20B in a state where a stem 51 of the plant 5 is held by the plurality of seedling nursery holders 37 is obtained. Thereafter, grafting is carried out using the second seedling nursery member 20B to obtain a grafted seedling.

Further, another method may be used in the production of grafted seedlings. For example, as shown in FIG. 21A, the plant 5 is grown in the first unit section 30A of the first seedling nursery member 20A. Then, an adhesive 41 is applied to two places of the stem 51 of the plant 5. The adhesive 41 has a function of a stem holder for holding the stem of the elongated plant 5. Thereafter, the second unit section 30B of the plate-shaped second seedling nursery member 20B is pressed against the plant 5 of the first unit section 30A of the first seedling nursery member 20A.

Then, as shown in FIG. 21B, by separating the second unit section 30B of the second seedling nursery member 20B from the first unit section 30A of the first seedling nursery member 20A, the stem 51 of the plant 5 is held by the second unit section 30B of the second seedling nursery member 20B via the adhesive 41. Thereafter, grafting is carried out using the second seedling nursery member 20B to obtain a grafted seedling.

Seventh Embodiment

Figure 22:
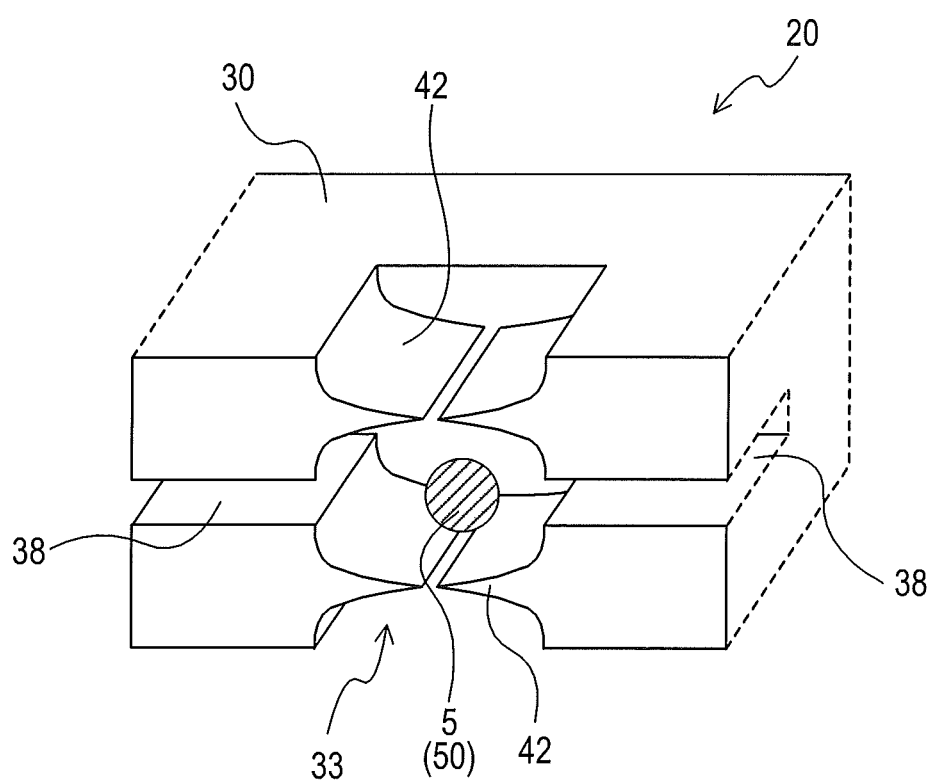
FIG. 22 is a perspective view showing a configuration of the seedling nursery member.
Figure 23A:
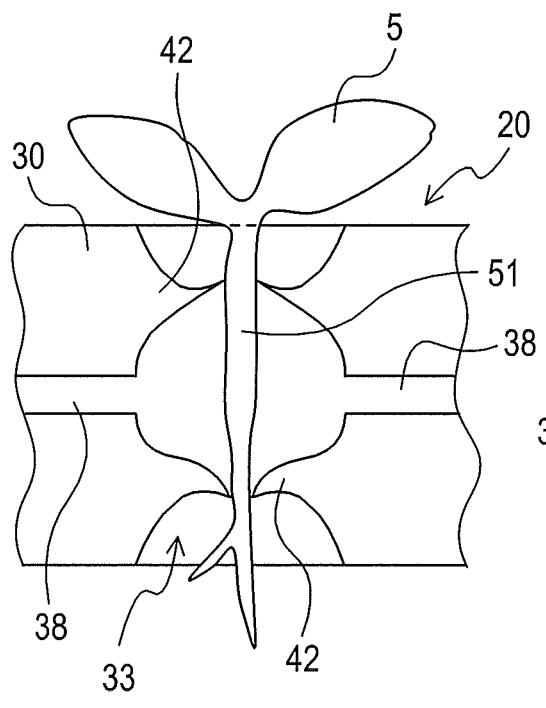
FIGS. 23A and 23B are plan views showing a state of nursery seedling using the seedling nursery member.
Figure 23B:
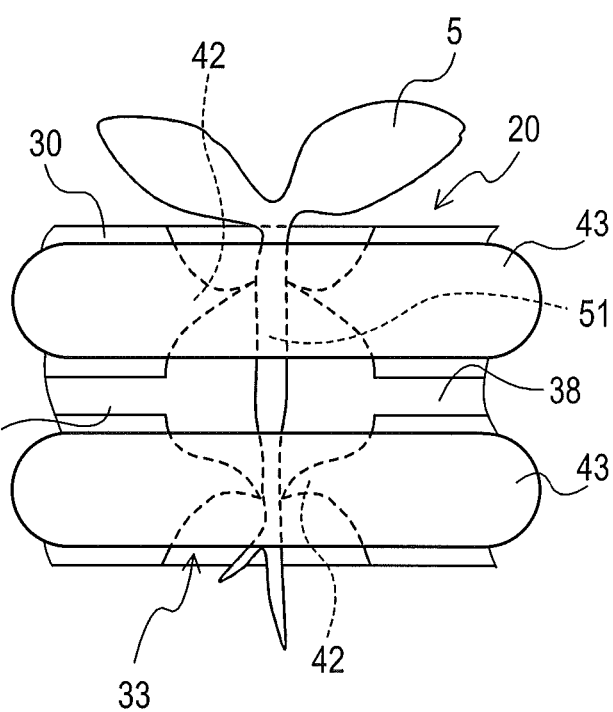

The seventh embodiment is an example in which the configuration of the seedling nursery member 20 (seedling nursery unit 30) for grafting is changed as shown in FIG. 22 and FIGS. 23A and 23B. It should be noted that descriptions of the same configurations, methods and operational advantages as those of the fifth embodiment are appropriately omitted.

As shown in FIG. 22, the seedling nursery unit 30 of the seedling nursery member 20 has a seedling nursery section 33 in which a seed storage section, a stem storage section, and a root storage section are integrated. Each two of four plate-shaped seedling nursery holders 37 formed so as to protrude from inner wall surfaces on both sides of the seedling nursery section 33 are vertically provided in the seedling nursery section 33. The width of the seedling nursery section 33 is adjusted to a width that allows water-absorbing seeds 50 of a plant 5 to be rotatable when germinating. The seedling nursery holder 42 is easily elastically deformable. When cotyledon develops, the seedling nursery holder 42 elastically deforms so as not to obstruct the development of the cotyledon. The seedling nursery holder 42 has a function of guiding elongation of the stem of the germinated plant 5 and a function of a stem holder for holding the stem of the elongated plant 5. Depressed groove-shaped cutting marks 38 are formed on both sides of the seedling nursery section 33. The cutting mark 38 is formed to be continuous to the seedling nursery section 33.

As shown in FIG. 23A, the seedling nursery holder 42 guides elongation of a stem 51 of the germinated plant 5 in the seedling nursery section 33 and holds the elongated stem 51. Consequently, the stem 51 of the elongated plant 5 can be sufficiently held by the seedling nursery holder 42. As shown in FIG. 23B, sheet members 43 are arranged vertically so as to cover an opening portion of the seedling nursery section 33 in a state where the stem 51 of the plant 5 is held by the seedling nursery holder 42, so that the stem 51 of the plant 5 can be held more sufficiently.

Other Embodiments

The present disclosure is not limited to the above embodiments, and it goes without saying that the present disclosure can be implemented in various modes without departing from the present disclosure.

(1) In the above embodiments, the seedling nursery member 20 has a plate shape, but the present invention is not limited thereto. Various shapes can be adopted. Further, the shapes of the seed storage section 32, the stem storage section 34, the stem holder 31, the root storage section 36, and the like of the seedling nursery unit 30 can be appropriately changed according to the type, size and the like of a target plant.

(2) In the above embodiments, the three cutting marks 38a, 38b, and 38c having different distances from the seed storage section 32 are formed on both sides of the stem storage section 34 of each of the seedling nursery units 30 in the seedling nursery member 20, but the number of the cutting marks is not limited thereto. Such a cutting mark may not be formed.

(3) In the above embodiments, after sowing seeds in the seed storage section 32 of the seedling nursery unit 30, the plant growth medium 40 is attached to one main surface of the seedling nursery member 20 via a membrane filter, and the seedling nursery member 20 is erected together with the plant growth medium 40 such that the stem storage section 34 is vertical. However, if a suitable amount of the plant growth medium is put in the seed storage section 32 together with the seeds, the seedling nursery member 20 in this state may be erected such that the stem storage section 34 is vertical. In this way, grafted seedlings can be produced in a space further reduced corresponding to the membrane filter and plant growth medium.

(4) In the above embodiments, when cutting a stem of a plant in the stem storage section 34 of the seedling nursery unit 30 of each of the seedling nursery members 20, the stem is cut together with the seedling nursery member 20. However, if the seedling nursery member 20 (seedling nursery unit 30) is configured to be dividable at the cutting position of the stem of the plant, only the stem of the plant is cut and the seedling nursery member 20 do not need to be cut. Thus, the seedling nursery member 20 can be reused.

(5) In the above embodiments, a grafted seedling is produced by grafting a plurality of plants. Here, the plurality of plants may be the same kind of plants or plants belonging to different species, or they may be mixed.

(6) In the above embodiments, a plant for a rootstock and a plant for a scion are grafted (two plants are grafted), or three plants are grafted while placing a plant for an intermediate rootstock between the plant for the rootstock and the plant for the scion. One or a plurality of plants for an intermediate rootstock may be used. That is, three plants can be grafted, or four or more plants can be grafted.

(7) The seedling nursery member 20 (seedling nursery unit 30) may be formed of, for example, a biodegradable material. In this case, grafted seedlings produced using the seedling nursery member 20 (seedling nursery unit 30) can be spread (sowed) on a large arable land together with the seedling nursery member 20 (seedling nursery unit 30) without taking out the grafted seedlings from the seedling nursery member 20 (seedling nursery unit 30). As the biodegradable material, zein (water-insoluble protein extracted from corn) or the like can be used.

(8) Each constituent element of the present disclosure is conceptual and is not limited to the above embodiments. For example, a function of one constituent element may be divided and assigned to multiple constituent elements. Alternatively, functions of multiple constituent elements may be consolidated and assigned to a single constituent element. Moreover, at least part of the configuration of the above embodiments may be replaced with a known configuration having the same function.

The invention claimed is:

1. A seedling nursery member for grafting, comprising:
at least one seedling nursery unit,
wherein the at least one seedling nursery unit includes a seed storage section configured to store seeds of a plant and have a space for the plant to germinate, a stem storage section configured to store a stem of the plant that has germinated and elongated, and a stem holder configured to hold the stem of the elongated plant,
at least a portion of the seed storage section of the at least one seedling nursery unit is configured to be openable so as to allow communication between an inside of the seed storage section and an outside of the at least one seedling nursery unit in a direction different from a growth direction where the plant grows,
at least a portion of the stem storage section of the at least one seedling nursery unit is configured to be openable so as to allow communication between an inside of the stem storage section and the outside of the at least one seedling nursery unit in the different direction, and
a width of the seed storage section in a direction perpendicular to the growth direction where the plant grows is larger than a width of the stem storage section in a direction perpendicular to the growth direction where the plant grows,
the seed storage section includes a root storage section that stores a root of the elongated plant and is open both in the growth direction where the plant grows and in the different direction, and
a length of the root storage section in the growth direction where the plant grows is larger than a width of the root storage section in a direction perpendicular to the growth direction where the plant grows.

2. The seedling nursery member for grafting according to claim 1, wherein the stem holder of the at least one seedling nursery unit is configured to be movable so as to hold the stem of the plant in a state of being in contact with the stem of the elongated plant.

3. The seedling nursery member for grafting according to claim 1, wherein the at least one seedling nursery unit has a plate shape.

4. The seedling nursery member for grafting according to claim 1, wherein the at least one seedling nursery unit includes an elastically deformable material.

5. The seedling nursery member for grafting according to claim 1, wherein the at least one seedling nursery unit includes a plurality of the seedling nursery units.

6. The seedling nursery member for grafting according to claim 5, wherein the plurality of seedling nursery units are integrally formed.

7. The seedling nursery member for grafting according to claim 5, wherein the plurality of seedling nursery units are arranged side by side in a predetermined direction such that the respective stem storage sections of the plurality of seedling nursery units are oriented in an identical direction.

8. The seedling nursery member for grafting according to claim 7, wherein in the plurality of seedling nursery units, the respective stem storage sections of the plurality of seedling nursery units are arranged side by side at equal intervals.

9. The seedling nursery member according to claim 1, wherein at least a portion of the seed storage section is configured to be openable to the outside of the at least one seedling nursery unit in the different direction so that a plant growth medium is supplied to the plant.

10. The seedling nursery member according to claim 1, wherein at least a portion of the stem storage section is configured to be openable to the outside of the at least one seedling nursery unit in the different direction so that the plant growth medium is supplied to the plant.

11. A seedling nursery set for grafting comprising a plurality of the seedling nursery members for grafting according to claim 1.

12. The seedling nursery member for grafting according to claim 1,
wherein the at least a portion of the seed storage section of the at least one seedling nursery unit is configured to be openable such that the seeds are introducible into the seed storage section in the different direction, and
the at least a portion of the stem storage section of the at least one seedling nursery unit is configured to be openable such that a plant growth medium is suppliable into the stem storage section in the different direction.

13. The seedling nursery member for grafting according to claim 1,
wherein the at least a portion of the seed storage section of the at least one seedling nursery unit is open so as to allow communication between the inside of the seed storage section and the outside of the at least one seedling nursery unit in the different direction, and
the at least a portion of the stem storage section of the at least one seedling nursery unit is open so as to allow communication between the inside of the stem storage section and the outside of the at least one seedling nursery unit in the different direction.

14. The seedling nursery member for grafting according to claim 1,
wherein the seed storage section is configured to store seeds of a plant before germination.

15. The seedling nursery member for grafting according to claim 1,
wherein the seed storage section opens downward, and
wherein the stem storage section opens upward.

16. The seedling nursery member for grafting according to claim 1,
wherein the at least one seedling nursery unit has a shape of a plate, a thickness direction thereof being parallel to the different direction.

17. The seedling nursery member for grafting according to claim 1,
wherein the at least one seedling nursery unit has a shape of a plate including a hole through which the stem of the plant passes, the hole being formed in a direction perpendicular to a thickness direction of the plate.

18. The seedling nursery member for grafting according to claim 1,
wherein the seed storage section has a circular cylindrical shape, a central axis thereof being parallel to the different direction, one end of the seed storage section being closed and the other end thereof being open.

19. A method for producing a grafted seedling, comprising:
preparing a first seedling nursery member and a second seedling nursery member, each of which comprises:
at least one seedling nursery unit,
wherein the at least one seedling nursery unit includes a seed storage section configured to store seeds of a plant and have a space for the plant to germinate, a stem storage section configured to store a stem of the plant that has germinated and elongated, and a stem holder configured to hold the stem of the elongated plant, at least a portion of the seed storage section of the at least one seedling nursery unit is configured to be openable so as to allow communication between an inside of the seed storage section and an outside of the at least one seedling nursery unit in a direction different from a growth direction where the plant grows, and at least a portion of the stem storage section of the at least one seedling nursery unit is configured to be openable so as to allow communication between an inside of the stem storage section and the outside of the at least one seedling nursery unit in the different direction;

storing seeds of a first plant in the seed storage section of the seedling nursery unit in the first seedling nursery member, germinating the seeds of the first plant in the seed storage section of the seedling nursery unit, and elongating a stem of the first plant in the stem storage section of the seedling nursery unit;

holding the stem of the first plant by the stem holder of the seedling nursery unit in the first seedling nursery member;

cutting the stem of the first plant held by the stem holder of the seedling nursery unit in the first seedling nursery member;

storing seeds of a second plant in the seed storage section of the seedling nursery unit in the second seedling nursery member, germinating the seeds of the second plant in the seed storage section of the seedling nursery unit, and elongating a stem of the second plant in the stem storage section of the seedling nursery unit;

holding the stem of the second plant by the stem holder of the seedling nursery unit in the second seedling nursery member;

cutting the stem of the second plant held by the stem holder of the seedling nursery unit in the second seedling nursery member; and joining a cut surface of the stem of the first plant held by the stem holder of the seedling nursery unit in the first seedling nursery member and a cut surface of the stem of the second plant held by the stem holder of the seedling nursery unit in the second seedling nursery member, wherein a width of the seed storage section in a direction perpendicular to the growth direction where the plant grows is larger than a width of the stem storage section in a direction perpendicular to the growth direction where the plant grows, wherein the seed storage section includes a root storage section that stores a root of the elongated plant and is open both in the growth direction where the plant grows and in the different direction, and wherein a length of the root storage section in the growth direction where the plant grows is larger than a width of the root storage section in a direction perpendicular to the growth direction where the plant grows.

20. The method for producing a grafted seedling according to claim 19 further comprising:

dividing the first seedling nursery member into a plurality of portions to form a plurality of divided pieces; and dividing the second seedling nursery member into a plurality of portions to form a plurality of divided pieces, wherein the joining of the cut surface of the stem of the first plant held by the stem holder of the seedling nursery unit in the first seedling nursery member and the cut surface of the stem of the second plant held by the stem holder of the seedling nursery unit in the second seedling nursery member includes arranging one of the plurality of divided pieces in the first seedling nursery member and one of the plurality of divided pieces in the second seedling nursery member such that the cut surface of the stem of the first plant held by the stem holder of the seedling nursery unit in the first seedling nursery member is in contact with the cut surface of the stem of the second plant held by the stem holder of the seedling nursery unit in the second seedling nursery member.

21. The method for producing a grafted seedling according to claim 19, wherein the at least a portion of the seed storage section of the at least one seedling nursery unit is configured to be openable such that the seeds are introducible into the seed storage section in the different direction, and the at least a portion of the stem storage section of the at least one seedling nursery unit is configured to be openable such that a plant growth medium is suppliable into the stem storage section in the different direction.

22. The method for producing a grafted seedling according to claim 19, wherein the at least a portion of the seed storage section of the at least one seedling nursery unit is open so as to allow communication between the inside of the seed storage section and the outside of the at least one seedling nursery unit in the different direction, and the at least a portion of the stem storage section of the at least one seedling nursery unit is open so as to allow communication between the inside of the stem storage section and the outside of the at least one seedling nursery unit in the different direction.

23. The method for producing a grafted seedling according to claim 19, wherein the seed storage section is configured to store seeds of a plant before germination.

24. The method for producing a grafted seedling according to claim 19, wherein the seed storage section opens downward, and wherein the stem storage section opens upward.

25. The method for producing a grafted seedling according to claim 19, wherein the at least one seedling nursery unit has a shape of a plate, a thickness direction thereof being parallel to the different direction.

26. The method for producing a grafted seedling according to claim 19, wherein the at least one seedling nursery unit has a shape of a plate including a hole through which the stem of the plant passes, the hole being formed in a direction perpendicular to a thickness direction of the plate.

27. The method for producing a grafted seedling according to claim 19, wherein the seed storage section has a circular cylindrical shape, a central axis thereof being parallel to the different direction, one end of the seed storage section being closed and the other end thereof being open.

28. A seedling nursery member for grafting, comprising:

at least one seedling nursery unit, wherein the at least one seedling nursery unit includes a seed storage section configured to store seeds of a plant and have a space for the plant to germinate, a stem storage section configured to store a stem of the plant that has germinated and elongated, and a stem holder configured to hold the stem of the elongated plant, at least a portion of the seed storage section of the at least one seedling nursery unit is configured to be openable so as to allow communication between an inside of the seed storage section and an outside of the at least one seedling nursery unit in a direction different from a growth direction where the plant grows, at least a portion of the stem storage section of the at least one seedling nursery unit is configured to be openable so as to allow communication between an inside of the stem storage section and the outside of the at least one seedling nursery unit in the different direction, and the stem storage section includes a cutting mark to be cut together with the stem of the plant, wherein the cutting mark has a shape of a depressed groove.

29. A method for producing a grafted seedling, comprising:

preparing a first seedling nursery member and a second seedling nursery member, each of which comprises:

at least one seedling nursery unit, wherein the at least one seedling nursery unit includes a seed storage section configured to store seeds of a plant and have a space for the plant to germinate, a stem storage section configured to store a stem of the plant that has germinated and elongated, and a stem holder configured to hold the stem of the elongated plant, at least a portion of the seed storage section of the at least one seedling nursery unit is configured to be openable so as to allow communication between an inside of the seed storage section and an outside of the at least one seedling nursery unit in a direction different from a growth direction where the plant grows, and at least a portion of the stem storage section of the at least one seedling nursery unit is configured to be openable so as to allow communication between an inside of the stem storage section and the outside of the at least one seedling nursery unit in the different direction;

storing seeds of a first plant in the seed storage section of the seedling nursery unit in the first seedling nursery member, germinating the seeds of the first plant in the seed storage section of the seedling nursery unit, and elongating a stem of the first plant in the stem storage section of the seedling nursery unit;

holding the stem of the first plant by the stem holder of the seedling nursery unit in the first seedling nursery member;

cutting the stem of the first plant held by the stem holder of the seedling nursery unit in the first seedling nursery member;

storing seeds of a second plant in the seed storage section of the seedling nursery unit in the second seedling nursery member, germinating the seeds of the second plant in the seed storage section of the seedling nursery unit, and elongating a stem of the second plant in the stem storage section of the seedling nursery unit;

holding the stem of the second plant by the stem holder of the seedling nursery unit in the second seedling nursery member;

cutting the stem of the second plant held by the stem holder of the seedling nursery unit in the second seedling nursery member; and joining a cut surface of the stem of the first plant held by the stem holder of the seedling nursery unit in the first seedling nursery member and a cut surface of the stem of the second plant held by the stem holder of the seedling nursery unit in the second seedling nursery member, wherein the stem storage section includes a cutting mark to be cut together with the stem of the plant, wherein the cutting mark has a shape of a depressed groove.

* * * * *